United States Patent
Tang et al.

(10) Patent No.: US 12,050,732 B2
(45) Date of Patent: Jul. 30, 2024

(54) INTEGRATED VIRTUAL BUTTON MODULE, INTEGRATED VIRTUAL BUTTON SYSTEM, AND METHOD OF DETERMINING USER INPUT AND PROVIDING USER FEEDBACK

(71) Applicant: UltraSense Systems, Inc., San Jose, CA (US)

(72) Inventors: Hao-Yen Tang, San Jose, CA (US); Hsiou-Yuan Liu, Boston, MA (US); Yonghuan David Ren, San Jose, CA (US); Mo Maghsoudnia, San Jose, CA (US)

(73) Assignee: UltraSense Systems, Inc., San Jose, CA (US)

( * ) Notice: Subject to any disclaimer, the term of this patent is extended or adjusted under 35 U.S.C. 154(b) by 0 days.

(21) Appl. No.: 18/454,668

(22) Filed: Aug. 23, 2023

(65) Prior Publication Data
US 2024/0028124 A1    Jan. 25, 2024

Related U.S. Application Data

(63) Continuation of application No. 17/870,316, filed on Jul. 21, 2022, now Pat. No. 11,775,073.

(51) Int. Cl.
G06F 3/01     (2006.01)
G06F 3/044    (2006.01)
G06F 3/16     (2006.01)

(52) U.S. Cl.
CPC .............. *G06F 3/016* (2013.01); *G06F 3/044* (2013.01); *G06F 3/167* (2013.01)

(58) Field of Classification Search
None
See application file for complete search history.

(56) References Cited

U.S. PATENT DOCUMENTS

2017/0255338 A1* 9/2017 Medina ................. G06F 3/0416
2017/0336903 A1* 11/2017 Rivaud .................. B60K 35/00

\* cited by examiner

*Primary Examiner* — Stephen T. Reed
(74) *Attorney, Agent, or Firm* — Perkins Coie LLP

(57) ABSTRACT

In some embodiments, an integrated virtual button module includes a first transducer, a microcontroller, and a first driver circuit. The first transducer includes a transient strain-sensing element and is configured to generate first signals. The microcontroller is configured to obtain first data from the first signals and determine user inputs in accordance with at least the first data. The first driver circuit is configured to receive user feedback data and to generate a first user feedback signal in accordance with the user feedback data. The first driver circuit is electronically couplable to a first actuator. The user feedback data are determined in accordance with at least the user inputs. The first actuator emits a haptic signal and/or a first audio signal when driven by the first user feedback signal. Embodiments of an integrated virtual button system and a method of determining user input and providing user feedback are also disclosed.

36 Claims, 12 Drawing Sheets

INTEGRATED VIRTUAL BUTTON MODULE, INTEGRATED VIRTUAL BUTTON SYSTEM, AND METHOD OF DETERMINING USER INPUT AND PROVIDING USER FEEDBACK

CROSS-REFERENCE TO RELATED APPLICATION(S)

This application is a continuation of U.S. patent application Ser. No. 17/870,316, filed on Jul. 21, 2022, entitled "INTEGRATED VIRTUAL BUTTON MODULE, INTEGRATED VIRTUAL BUTTON SYSTEM, AND METHOD OF DETERMINING USER INPUT AND PROVIDING USER FEEDBACK," which is incorporated herein by reference in its entirety.

BACKGROUND

There are numerous user-accessible surfaces in consumer electronics products (e.g., smartphone, tablet, wearable device, etc.), home appliances (e.g., television, washer, dryer, refrigerator, etc.), office electronics products (e.g., monitor, laptop computer, desktop computer, video conferencing system, etc.), and automotive products (e.g., door handle, door lock/unlock control, window up/down control, driving controls, air conditioning controls, etc.) in which a virtual button could potentially replace conventional mechanical buttons. In these situations, it would be preferable for a virtual button to provide enhanced functionality including enhanced feedback to the user (user feedback). Some conventional mechanical buttons are designed to be readily identifiable by the user, such as by a protrusion, a hole, a ridge, or another particular shape that can be felt by the user. On the other hand, there are opportunities to implement new virtual buttons with user feedback that is different from that of conventional mechanical buttons. Solid-state transducers can be used in virtual button implementations. Solid-state transducers can be made using micro-electromechanical systems (MEMS) technologies. By using MEMS and CMOS (complementary metal-oxide semiconductor) processing technologies, solid-state transducers, analog front-end processors, and microcontrollers can be integrated into one integrated circuit (IC) device. In order to implement new user feedback features, it would be preferable to integrate one or more actuators into the virtual button system.

SUMMARY OF THE INVENTION

In one aspect, an integrated virtual button module may include a first transducer including a transient strain-sensing element and configured to generate first signals, a microcontroller configured to obtain first data from the first signals and determine user inputs in accordance with at least the first data, and a first driver circuit configured to receive user feedback data and to generate a first user feedback signal in accordance with user feedback data. The first driver circuit is electronically couplable to a first actuator. The user feedback data may be determined in accordance with at least the user inputs. The first actuator may emit a haptic signal and/or a first audio signal when driven by the first user feedback signal. In some implementations, the first actuator may emit a haptic signal when driven by the first user feedback signal. In some implementations, the first actuator may emit a first audio signal when driven by the first user feedback signal. In some implementations, the first actuator may emit a haptic signal and a first audio signal, such that the first user feedback signal may include a signal for driving haptic feedback and another signal for driving audio feedback.

In another aspect, the integrated virtual button module can include a module housing, with at least some of the components of the module (e.g., first transducer, additional transducers, microcontroller, first driver circuit, additional driver circuits) housed in the housing. In some implementations, the integrated virtual button module may include a circuit board, to which at least some components of the module (e.g., first transducer, additional transducers, microcontroller, first driver circuit, additional driver circuits) are mounted.

In yet another aspect, the microcontroller of the integrated virtual button module may be configured to determine the user feedback data in accordance with at least the user inputs. In some implementations, the microcontroller may be configured to determine the user feedback data in accordance with at least the user inputs and state information.

In yet another aspect, the microcontroller of the integrated virtual button module may be electronically couplable to a host processor via a bus. The host processor may be configured to determine the user feedback data when the microcontroller is electronically coupled to the host processor. In some implementations, the bus is selected from: $I^2C$ bus, LIN bus, CAN bus, SPI bus, and UART bus.

In yet another aspect, the transient strain-sensing element of the integrated virtual button module can be a piezoelectric micromechanical force-measuring element (PMFE).

In yet another aspect, the integrated virtual button module may include an integrated circuit (IC). The IC may include the first transducer and the microcontroller. In other implementations, the IC may include additional transducers.

In yet another aspect, the integrated virtual button module may additionally include a second transducer configured to generate second signals. The microcontroller may be configured to obtain second data from the second signals and determine the user inputs in accordance with at least the first data and the second data. In some implementations, the integrated virtual button module may include an elastic circuit board substrate and the second transducer can include one or more sensor electrodes positioned on or in the elastic circuit board substrate. The second data may include (1) capacitance between at least one of the sensor electrodes and its surrounding environment (self-capacitance data) and/or (2) capacitance between a first one of the sensor electrodes and a second one of the sensor electrodes (mutual capacitance data). In some implementations, the second transducer may include one or more piezoelectric micromechanical ultrasonic transducers (PMUTs).

In yet another aspect, the integrated virtual button module may additionally include a second driver circuit configured to generate a second user feedback signal in accordance with the user feedback data. The second driver circuit is electronically couplable to a second actuator. The second actuator may emit a second audio signal or a visible light signal when driven by the second user feedback signal.

In yet another aspect, the integrated virtual button module may additionally include a third driver circuit configured to generate a third user feedback signal in accordance with the user feedback data. The third driver circuit is electronically couplable to a third actuator. The third actuator may emit a visible light signal when driven by the third user feedback signal. In some implementations, the third actuator may include a light source or a display. The light source or display may be included in the integrated virtual button module.

In yet another aspect, an integrated virtual button system may include cover member, a first transducer including a transient strain-sensing element, the first transducer being mechanically coupled to the cover member and configured to generate first signals in response to a perturbation at the cover member, a microcontroller configured to obtain first data from the first signals and determine user inputs in accordance with at least the first data, a first driver circuit configured to receive user feedback data and to generate a first user feedback signal in accordance with the user feedback data, and a first actuator electronically coupled to the first driver circuit. The user feedback data may be determined in accordance with at least the user inputs. The first actuator may emit a haptic signal and/or a first audio signal when driven by the first user feedback signal. In some implementations, the first actuator may emit a haptic signal when driven by the first user feedback signal. In some implementations, the first actuator may emit a first audio signal when driven by the first user feedback signal. In some implementations, the first actuator may emit a haptic signal and a first audio signal, such that the first user feedback signal may include a signal for driving haptic feedback and another signal for driving audio feedback.

In yet another aspect, the microcontroller of the integrated virtual button system may be configured to determine the user feedback data in accordance with at least the user inputs. In some implementations, the microcontroller may be configured to determine the user feedback data in accordance with at least the user inputs and the state information.

In yet another aspect, the integrated virtual button system additionally includes a host system. The host system includes a host processor and a memory storing an integrated virtual button software code. The host processor is electronically coupled to the microcontroller via a bus. The host processor may be configured to execute the integrated virtual button software code to (a) receive the user inputs from the microcontroller, (b) determine user feedback data in accordance with at least the user inputs, and (c) transmit the user feedback data via the bus. In some implementations, the bus is selected from: FC bus, LIN bus, CAN bus, SPI bus, and UART bus.

In yet another aspect, the transient strain-sensing element of the integrated virtual button system can be a piezoelectric micromechanical force-measuring element (PMFE).

In yet another aspect, the integrated virtual button system may include an integrated circuit (IC). The IC may include the first transducer and the microcontroller. In other implementations, the IC may include additional transducers.

In yet another aspect, the integrated virtual button system may additionally include a second transducer configured to generate second signals in response to the perturbation. The microcontroller may be configured to obtain second data from the second signals and determine the user inputs in accordance with at least the first data and the second data. In some implementations, the cover member may be electrically non-conducting, the integrated virtual button system may include an elastic circuit board substrate mechanically coupled to the cover member, and the second transducer can include one or more sensor electrodes positioned on or in the elastic circuit board substrate. The second data may include (1) capacitance between at least one of the sensor electrodes and its surrounding environment (self-capacitance data) and/or (2) capacitance between a first one of the sensor electrodes and a second one of the sensor electrodes (mutual capacitance data). In some implementations, the second transducer may include one or more piezoelectric micromechanical ultrasonic transducers (PMUTs).

In yet another aspect, the first actuator of the integrated virtual button system may include a haptic actuator. In some implementations, the haptic actuator can be implemented as a voice coil motor.

In yet another aspect, the integrated virtual button system may additionally include a second driver circuit configured to generate a second user feedback signal in accordance with the user feedback data, and a second actuator electronically coupled to the second driver circuit. The second actuator may emit a second audio signal or a visible light signal when driven by the second user feedback signal. In some implementations, the first actuator emits the first audio signal, the second actuator emits the second audio signal, and the second audio signal is of a higher frequency than the first audio signal. In some implementations, the second actuator may include a speaker, a light source, or a display.

In yet another aspect, the integrated virtual button system may additionally include a third driver circuit configured to generate a third user feedback signal in accordance with the user feedback data, and a third actuator electronically coupled to the third driver circuit. The third actuator may emit a visible light signal when driven by the third user feedback signal. In some implementations, the third actuator may include a light source or a display.

In yet another aspect, a method of determining user input and providing user feedback includes (A1), (A2), (A3), (A4), (A5), and (A6). (A1) includes generating, by a first transducer, first signals in response to a perturbation at a cover member. The first transducer is mechanically coupled to the cover member. The first transducer may include a transient strain-sensing element. The transient strain-sensing element can be a piezoelectric micromechanical force-measuring element (PMFE). (A2) includes obtaining, by a microcontroller, first data from the first signals. (A3) includes determining, by the microcontroller, user inputs in accordance with at least the first data. (A4) includes determining user feedback data in accordance with at least the user inputs. (A5) includes generating, by a first driver circuit, a first user feedback signal in accordance with the user feedback data. (A6) includes emitting, by a first actuator, a haptic signal and/or a first audio signal when driven by the first user feedback signal. In some implementations, the first actuator may emit a haptic signal when driven by the first user feedback signal. In some implementations, the first actuator may emit a first audio signal when driven by the first user feedback signal. In some implementations, the first actuator may emit a haptic signal and a first audio signal, such that the first user feedback signal may include a signal for driving haptic feedback and another signal for driving audio feedback.

In yet another aspect, the determining of the user feedback data (A4) may be carried out by the microcontroller. The microcontroller may be configured to determine the user feedback data in accordance with at least the user inputs. In some implementations, the microcontroller may be configured to determine the user feedback data in accordance with at least the user inputs and the state information.

In yet another aspect, the determining of the user feedback data (A4) includes executing, by a host processor, an integrated virtual button software code to (a) receive the user inputs from the microcontroller, (b) determine the user feedback data in accordance with at least the user inputs, and (c) transmit the user feedback data to the microcontroller and/or the first driver circuit.

In yet another aspect, the method of determining user input and providing user feedback data includes (B1) and (B2). (B1) includes generating, by a second transducer, second signals in response to the perturbation. (B2) includes obtaining, by the microcontroller, second data from the second signals. In accordance with the method, (A3) includes determining, by the microcontroller, user inputs in accordance with at least the first data and the second data. In some implementations, the second transducer can include one or more sensor electrodes positioned on or in the elastic circuit board substrate, with the elastic circuit board substrate being mechanically coupled to the cover member (at which the perturbation occurs). The second data may include (1) capacitance between at least one of the sensor electrodes and its surrounding environment (self-capacitance data) and/or (2) capacitance between a first one of the sensor electrodes and a second one of the sensor electrodes (mutual capacitance data). In some implementations, the second transducer may include one or more piezoelectric micromechanical ultrasonic transducers (PMUTs).

In yet another aspect, the first actuator in accordance with the method of determining user input and providing user feedback may include a haptic actuator. In some implementations, the haptic actuator can be implemented as a voice coil motor.

In yet another aspect, the method of determining user input and providing user feedback may include (C1) and (C2). (C1) includes generating, by a second driver circuit, a second user feedback signal in accordance with the user feedback data. (C2) includes emitting, by a second actuator, a second audio signal or a visible light signal when driven by the second user feedback signal. In some implementations, the first actuator emits the first audio signal, the second actuator emits the second audio signal, and the second audio signal is of a higher frequency than the first audio signal. In some implementations, the second actuator may include a speaker, a light source, or a display.

In yet another aspect, the method of determining user input and providing user feedback may include (D1) and (D2). (D1) includes generating, by a third driver circuit, a third user feedback signal in accordance with the user feedback data. (D2) includes emitting, by a third actuator, a visible light signal when driven by the third user feedback signal. In some implementations, the third actuator may include a light source or a display.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

The present disclosure relates to user-input systems, user-input modules, and methods of detecting a user-input at a cover member of a user-input system.

In this Disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
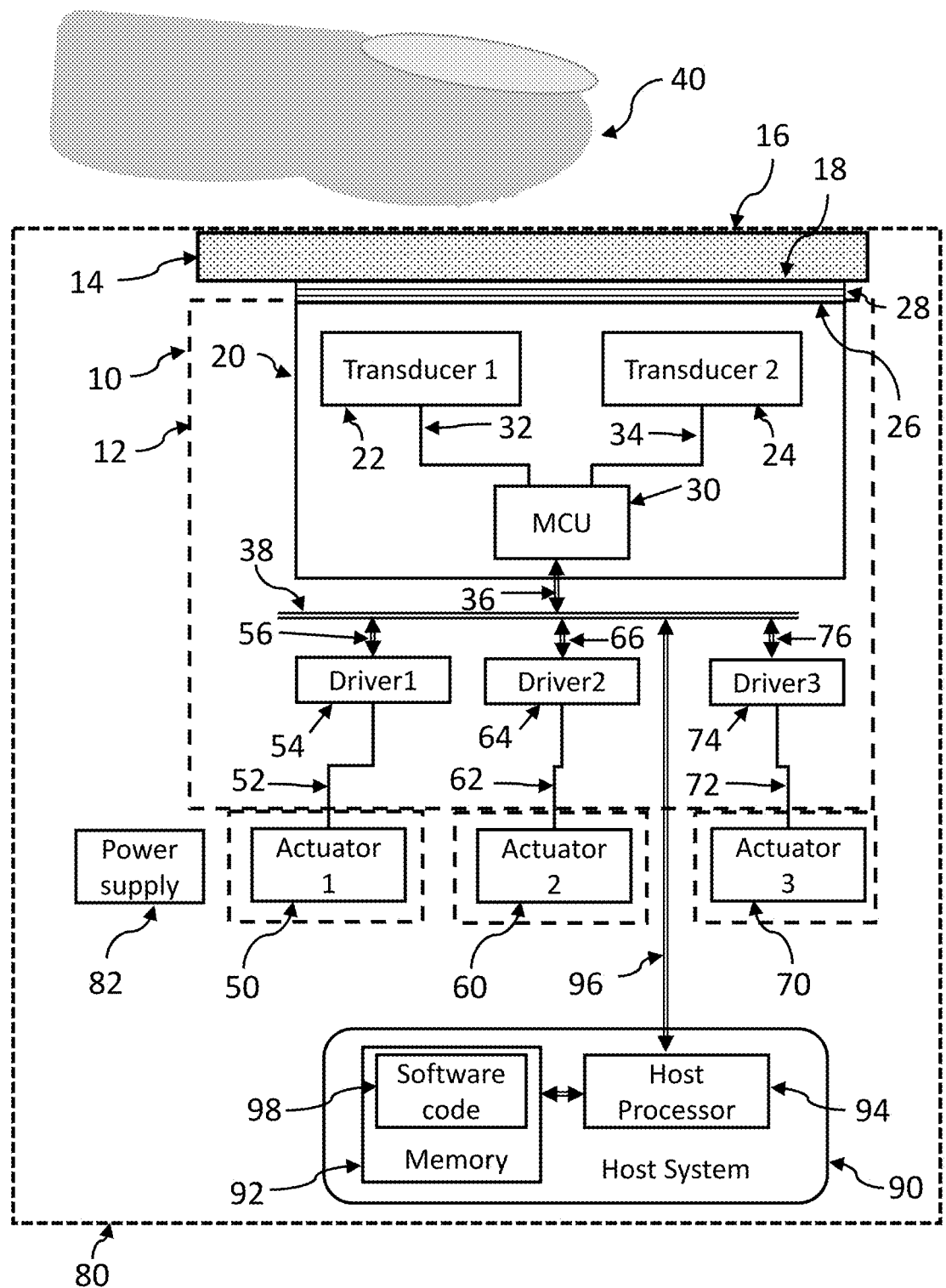
FIG. 1 is a schematic block diagram of an implementation of an integrated virtual button system and an integrated virtual button module.

FIG. 1 is a schematic block diagram of an implementation of an integrated virtual button module 10 and an integrated virtual button system 80 in accordance with some embodiments. In the example shown, the integrated virtual button system 80 includes a host system 90. The host system 90 can be any electronic system to which the module 10 electronically coupled (e.g., via interconnection 96). The integrated virtual button system 80 can be implemented in various applications. There are numerous user-accessible surfaces in consumer electronics products (e.g., smartphone, tablet, wearable device, etc.), home appliances (e.g., television, washer, dryer, refrigerator, etc.), office electronics products (e.g., monitor, laptop computer, desktop computer, printer, video conferencing system, etc.), and automotive products (door handle, door lock/unlock control, window up/down control, driving controls, air conditioning controls, etc.). For example, depending on the application, the host system 90 could be a smartphone, a computer, or an automotive controller system. The host system 90 includes a host processor 94 (e.g., an application processor) and a memory 92 electronically coupled to the host processor 94. The memory 92 stores an integrated virtual button software code 98. The host processor 94 is configured to execute the integrated virtual button software code 98 as explained herein. The host processor 94 is electronically coupled to the microcontroller 30, as well as to the driver circuits (54, 64, 74) depending on the particular implementation, via the bus (e.g., 38, 96, 56, 66, 76).

In the example shown, the integrated virtual button module 10 includes transducer IC 20 including a first transducer 22, a second transducer 24, and a microcontroller (MCU) 30. In other examples, a transducer IC 20 may have one transducer or more than two transducers. In a preferred implementation, the transducers (22, 24) may be solid-state transducers and can be fabricated using MEMS technologies, and the MCU 30 can be fabricated using CMOS technologies. For example, the MEMS and CMOS chips can be assembled into a packaged transducer IC 20. In the example shown, the MCU 30 is electrically connected to the first transducer 22 via an interconnection 32 and to the second transducer 24 via an interconnection 34.

The integrated virtual button module 10 may include a module housing 12 which can be used to house at least some of the components of the integrated virtual button module 10 (e.g., the transducer IC 20, a circuit board, circuits such the driver circuits (54, 64, 74), and other components including possibly one or more of the actuators (50, 60, 70)). In some implementations, the housing 12 is a sealed housing that is sealed against moisture/and or dust. For example, the components of the sealed housing can be sealed by ultrasonic welding. In some implementations, the virtual button module 10 includes a circuit board substrate (not explicitly shown in FIG. 1), to which the transducer IC 20 is mounted. In the example shown, the integrated virtual button module 10 includes a first driver circuit 54, a second driver circuit 64, and a third driver circuit 74. In other implementations, the integrated virtual button module 10 may include one driver circuit, two driver circuits, or more than three driver circuits. MCU 30, first driver circuit 54, second driver circuit 64, and third driver circuit 74 are interconnected via a bus. FIG. 1 shows a main bus line 38, respective bus lines between main bus line 38 and first driver circuit 54 (bus line 56), second driver circuit 64 (bus line 66), and third driver circuit 74 (bus line 76), and a bus line 96 between main bus line 38 and a host processor 94. Buses that can be used herein include: I²C bus, LIN bus, CAN bus, SPI bus, and UART bus. Direct point-to-point interconnections can be used in lieu of the bus connections among the components, e.g., MCU 30, first driver circuit 54, second driver circuit 64, third driver circuit 74, and host processor 94.

As shown in FIG. 1, the integrated virtual button system 80 includes a cover member 14. The cover member 14 has an outer surface 16, which faces outwards and presents a user-accessible surface (e.g., by touch with a finger, by pressing with a finger, finger hovering right above it). The cover member 14 has an inner surface 18 opposite the outer surface 16. In the example shown, module housing 12 includes a mechanical coupling region 26, which is attached to the inner surface 18 via an adhesive 28. The adhesive 28 could be double-sided tape, pressure sensitive adhesive (PSA), epoxy adhesive, or acrylic adhesive, for example. The transducer IC 20 is attached to the module housing 12 at the mechanical coupling region 26. Accordingly, the transducers 22, 24 are mechanically coupled to the cover member 14. In some implementations, transducers 22, 24 are mechanically coupled to the cover member 14 in the sense that a mechanical deformation of the cover member 14 is transmitted to the transducers 22, 24. During operation of the integrated virtual button system 80, a perturbation may occur at the outer surface 16 of the cover member 14. We refer to any event detectable via one or more of the transducers as a perturbation. In the example shown, the perturbation includes a touch event in which a finger 40 touches or presses the cover member 14 at the outer surface 16. In other cases, a perturbation may also include another object (e.g., water droplet or a rock) hitting the cover member 14. In yet other cases, a perturbation may include a finger 40 hovering close to or in contact with the outer surface, detectable by measurements of capacitance via sensor electrode(s), as described herein. In some cases, the perturbation at the cover member can include a mechanical deformation at the cover member.

In the example shown in FIG. 1, the mechanical coupling region 26 is at the "top surface" of the transducer IC 20, closer to the transducers 22, 24 than to the MCU 30. However, in other implementations the mechanical coupling region 26 can be the "bottom surface" of the transducer IC 20, closer to the MCU 30 than to the transducers 22, 24. In the example shown in FIG. 1, the mechanical coupling region 26 is coupled to the cover member 14 via an adhesive layer 28. In some implementations, there may be one or more additional intervening layers between the mechanical coupling region 26 and the cover member 14. For example, the transducer IC 20 can be mounted to a circuit substrate (e.g., a flexible circuit substrate), the circuit substrate can be adhered to module housing 12 at the mechanical coupling region 26, and the housing 12 can be adhered the cover member 14 via an adhesive layer 28. In such a case, any mechanical deformation at the cover member would be transmitted via the adhesive layer, the circuit substrate, and then to the transducer IC. It is possible to implement a system (e.g., integrated virtual button system 80) without assembling the relevant components into a module (e.g., integrated virtual button module or a modular housing (e.g., module housing 12). In some cases, it is possible to adhere a transducer IC to a cover member with just an intervening adhesive layer 28.

In the example shown in FIG. 1, the integrated virtual button system 80 includes a first actuator 50, a second actuator 60, and a third actuator 70. In other implementations, the integrated virtual button system 80 may include one actuator, two actuators, or more than three actuators. First actuator 50 is electronically coupled to first driver circuit 54 via interconnection (e.g., wiring) 52, second actuator 60 is electronically coupled to second driver circuit 64 via interconnection (e.g., wiring) 62, and third actuator 70 is electronically coupled to third driver circuit 74 via interconnection (e.g., wiring) 72. One or more of these actuators 50, 60, 70 may be integrated into the module 10, particularly if the actuator is small. For example, it may be possible to mount an actuator (e.g., light-emitting diode chip) to a circuit board in the module. The actuators 60, 70 are devices that can be configured to provide feedback to a user of the integrated virtual button system. For example, the user can be a person whose finger 40 is shown. The feedback to the user can take different forms, such as haptic feedback (e.g., vibrotactile feedback to finger 40), audio feedback (e.g., words, sentences, audible alarms, sounds, music), and visual feedback (e.g., visible light (varying colors or intensities or both, visible information presented on a display). In order to provide a virtual button system with enhanced functionalities, it may be preferable to provide two or more kinds of feedback to the user.

FIG. 1 shows a power supply 82, supplying power to some or all of the components in system 80, such as transducer IC 20, MCU 30, driver circuits 54, 64, 74, and actuators 50, 60, The power supply can be included in the integrated virtual button system 80 (e.g., a portable power supply such as a battery). In other implementations, the power supply 82 can be a mains power supply, outside of integrated virtual button system 80.

In the example shown in FIG. 1, the first transducer 22 is mechanically coupled to the cover member 14 and is configured to generate first signals in response to a perturbation at the cover member. For example, the first transducer 22 can include a piezoelectric micromechanical force-measuring element (PMFE) and an analog front-end (AFE) circuitry connected to the PMFE. As explained in detail herein, a PMFE is an example of a strain-sensing element. A PMFE is a transient strain-sensing element that is sensitive to the time-varying strain, unlike other strain-sensing elements such as a strain gauge. In some implementations, the AFE circuitry can include an amplifier that amplifies and conditions the signals output by the PMFE to produce an amplified analog signal and an analog-to-digital converter (ADC) that converts the amplified analog signal to a digital signal.

In the example shown in FIG. 1, the integrated virtual button system 80 (and the integrated virtual button module 10) additionally includes a second transducer 24. In this example, the second transducer 24 is a solid-state transducer and is included in the transducer IC 20. In some implementations, the second transducer is not a solid-state transducer and is not included in the transducer IC 20. In the example shown in FIG. 1, the second transducer 24 is mechanically coupled to the cover member 14 and is configured to generate second signals in response to the perturbation at the cover member. The second transducer 24 can include a same type of transducer element as the first transducer 22 or can include a different type of transducer element. For example, the first transducer 22 and the second transducer 24 can both include a respective PMFE. In some implementations, the first solid-state transducer 22 can include a PMFE and the second solid-state transducer 24 can include a piezoelectric micromechanical ultrasonic transducer (PMUT). In some implementations, the first solid-state transducer 22 can include a PMFE and the second solid-state transducer 24 can include one or more sensor electrodes, e.g., for capacitance measurements. In some implementations, by employing two or more measurement mechanisms (e.g., combination of PMFEs and PMUTs, combination of PMFEs and capacitance sensing), it may be possible to reduce or eliminate false triggers in determining user inputs. In some implementations, other types of transducer/sensor elements can be used. Other possible transducer/sensor elements include temperature sensors, inductance sensors, and strain gauges. Other transducer/sensor elements can provide additional information about user input or the surrounding environment, for example. In some implementations, a transducer/sensor element can be implemented as a solid-state element. In some implementations, a transducer/sensor element can be implemented as a solid-state element and be incorporated into the transducer IC 20. In some implementations, a transducer/sensor element can be implemented as a solid-state element and be mounted on a circuit board substrate inside the integrated virtual button system 80 and/or the integrated virtual button module 10, separate from the transducer IC 20. In some implementations, a transducer/sensor element can be implemented as a non-solid-state element (e.g., an element comprising mechanical parts that move in response to an input) and be incorporated into the integrated virtual button system 80. Some transducer/sensor elements (e.g., PMFE) need to be mechanically coupled to the cover member but some other transducer/sensor elements (e.g., temperature sensor) need not be mechanically coupled to the cover member.

In some implementations, the microcontroller (MCU) 30 is configured to obtain first data from the first signals (generated by and received from the first transducer 22) and to determine a user input in accordance with at least the first data. The first signals can take various forms depending upon the particulars of the implementation. For example, the first signals can be amplified analog signals (e.g., after amplification at an AFE that receives analog signals from PMFE(s)) or digital signals (e.g., after analog-to-digital conversion and/or other digital signal processing). For example, the first data obtained by the MCU 30 can indicate a finger press, followed by a hold (press & hold). For example, the first data can indicate a finger press, followed by release (press & release). In some cases, the MCU 30 can perform additional data processing on the first signals to obtain the first data, e.g., compare the first signals to a trigger threshold to determine whether the cover member has been touched by a finger. If there is also a second transducer, the MCU 30 can also be configured to obtain second data from the second signals and to determine a user input in accordance with at least the first data and the second data.

In some implementations, the microcontroller (MCU) 30 is configured to obtain first data from the first signals and is configured to determine a user input in accordance with at least the first data and state information. State information can include information relating to operational states of the integrated virtual button system 80 and/or parts thereof (e.g., integrated virtual button module 10, host system 90). Some examples of operational states are: Sleeping (e.g., module 10 is in a stand-by mode to save power), Active (e.g., module 10 is ON and is ready to receive user inputs), and Off-Line (e.g., host system 90 is turned off or disconnected from the bus). In some implementations, a user input that is determined when a first data is obtained in a first operational state differs from a user input that is determined when the same first data is received in a second operational state different from the first operational state. For example, if a first data of "press & release" is obtained when the operational state is "Sleeping", the following user input may be determined: initialize the module 10 (transition the module from the Sleeping state to the Active state). For example, if a first data of "press & release" is obtained when the operational state is "Active", the following user input may be determined: "carry out a predetermined action" (e.g., open window of automobile). The user input may be transmitted to the host processor 94 for additional processing and for taking additional action.

In some implementations, MCU 30 is electronically couplable (e.g., by a bus) to a host processor 94 of the host system 90. In the example shown in FIG. 1, the host processor 94 is electronically coupled to the microcontroller 30 and the driver circuits (e.g., 54, 64, 74) via the bus. In some implementations, MCU 30 is configured to transmit one or more user inputs to the host processor 94. The host processor 94 is configured to execute the integrated virtual button software code 98 to (a) receive the user inputs from the microcontroller 30, (b) determine user feedback data in accordance with at least the user inputs, and (c) transmit the user feedback data via the bus. For example, the user feedback data can include, for example, voltage waveform data or pulse-width modulated data optimized for each type of actuator (e.g., voice coil motor, speaker, LED). Furthermore, the user feedback data can be optimized or tuned to the particular characteristics of each actuator (e.g., manufacturer, model number, lot number). Upon being received at the respective driver circuits (e.g., 54, 64, 74), the user feedback data can undergo digital-to-analog conversion and any other suitable signal conditioning, and the corresponding analog signals can be used to drive the respective actuators (e.g., 50, 60, 70). For example, the memory 92 can be used to store data relating to the characteristics of the actuators (e.g., 50, 60, 70) which may be used by the host processor 94 when executing the integrated virtual button software code 98 to calculate ("determine") optimized user feedback data in accordance with at least the user inputs. The host processor 94 can then transmit the calculated user feedback data via the bus. For example, the memory 92 can be used to store waveform data for driving the actuators (e.g., suitable voltage waveform data and/or pulse-width modulation waveform data for each of the actuators and for each possible user input). When executing the integrated virtual button software code 98, the host processor 94 can select and retrieve ("determine") a suitable waveform data from amongst the waveform data stored in the memory 92. The host processor 94 can then transmit the selected and retrieved user feedback data via the bus. Accordingly, the host processor 94 can determine user feedback data for one or more actuators (e.g., 50, 60, 70) when executing the integrated virtual button software code 98.

The host processor 94 can also be used to calculate user feedback data for driving more than one feedback response in one actuator. For example, the inventors have found that a voice coil motor can be configured to concurrently emit a haptic signal (e.g., generate haptic feedback) and an audio signal (e.g., generate audio feedback) when driven by a suitable superposition of a haptic feedback signal and an audio signal. Accordingly, the host processor 94 can calculate and transmit user feedback data, that when digital-to-analog converted at a driver circuit (e.g., first driver circuit 54), results in a user feedback signal (e.g., a first user feedback signal) containing a superposition of the haptic feedback signal and the audio signal. According to the foregoing description, the host system carries out the task of determining user feedback data. In other implementations, MCU 30 can be configured to determine the user feedback data. For example, such an implementation can become possible when MCU 30 has sufficient computing capacity and/or memory capacity. MCU 30 would need sufficient computing capacity and memory capacity for storing and executing an integrated virtual button software code. Additionally, MCU 30 would need sufficient memory capacity for (1) storing data relating to the characteristics of the actuators, and/or (2) storing waveform data for driving the actuators.

The integrated virtual button system 80 may include one actuator ("first actuator"), two actuators ("first actuator" and "second actuator"), three actuators ("first actuator", "second actuator", and "third actuator"), or more than three actuators ("first actuator", "second actuator", "third actuator", and other(s)). In some implementations, the first actuator may emit a haptic signal and/or a first audio signal when driven by the first user feedback signal. In some implementations, the first actuator may emit a haptic signal when driven by the first user feedback signal. In some implementations, the first actuator may emit a first audio signal when driven by the first user feedback signal. In some implementations, the first actuator may emit a haptic signal and a first audio signal, such that the first user feedback signal may include a superposition of a signal for driving haptic feedback and another signal for driving audio feedback. In some implementations, the first actuator may emit a visible light signal. In some implementations, the first actuator of the integrated virtual button system may include a haptic actuator. In some implementations, the haptic actuator can be implemented as a voice coil motor. Some examples of haptic actuators are: voice coil motor, electric motor, electro-magnetic motor, solenoid, eccentric rotating mass (ERM) vibration motor, harmonic ERM motor (HERM), linear resonant actuator (LRA), piezoelectric actuator, electroactive polymer (EAP) actuator, shape memory alloy, electrostatic friction display, ultrasonic vibration generator, and high bandwidth actuator.

In some implementations, the second actuator may emit a second audio signal or a visible light signal when driven by the second user feedback signal. In some implementations, the first actuator emits the first audio signal, the second actuator emits the second audio signal, and the second audio signal is of a higher frequency than the first audio signal. In some implementations, the second actuator may include a speaker, a light source, or a display. In some implementations, the third actuator may emit a visible light signal when driven by the third user feedback signal. In some implementations, the third actuator may include a light source or a display.

In addition, the host processor 94 can transmit commands to the MCU 30. Commands transmitted from the host processor 94 to the microcontroller 30 can include commands that determine one or more aspects of the operation of the transducers 22, 24. For example, the commands might determine a sensitivity (e.g., degree of amplification of an analog signal) of the first transducer 22 and/or the second transducer 24. For example, the commands might determine a trigger threshold (e.g., threshold signal level above or below which the measured signal indicates a finger press) of the first transducer 22 and/or the second transducer 24.

Figure 2:
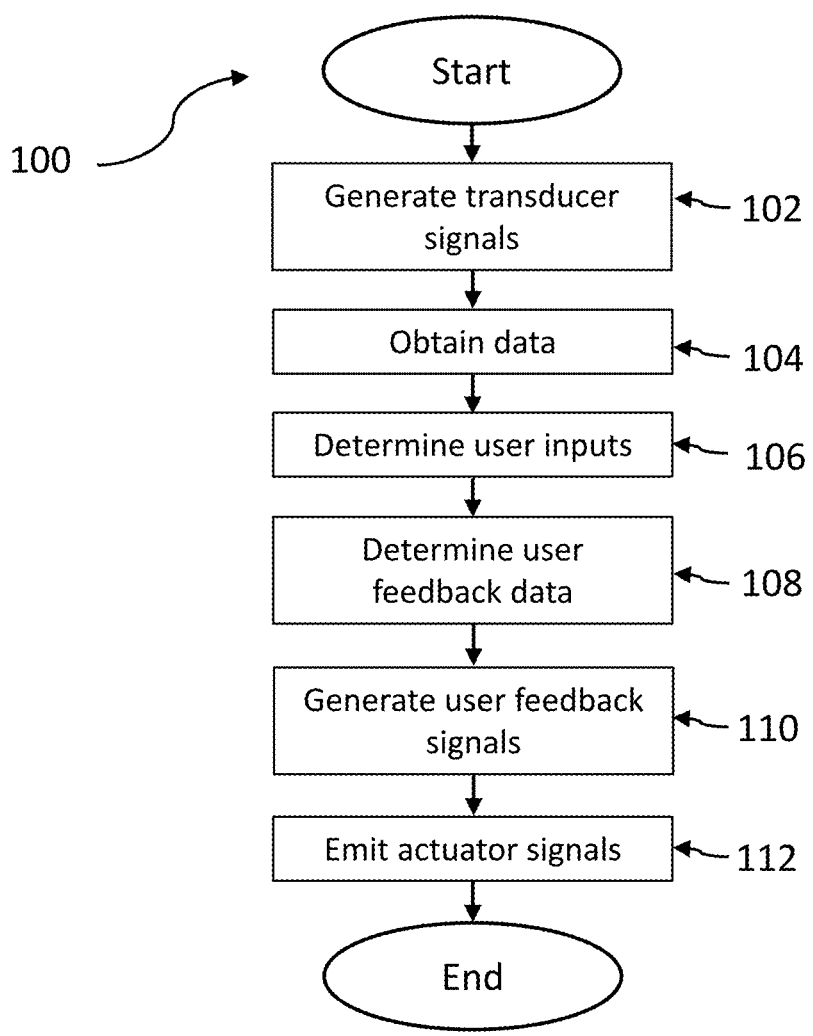
FIG. 2 shows a flow diagram of a method of determining user input and providing user feedback.

FIG. 2 is a flow diagram of a method 100 of determining user input and providing user feedback. The method 100 includes steps 102, 104, 106, 108, 110, and 112. Step 102 includes generating, by a first transducer 22, first signals in response to a perturbation at a cover member 14 (FIG. 1). The first transducer 22 is mechanically coupled to the cover member 14. The first transducer 22 may include a transient strain-sensing element. The transient strain-sensing element can be a piezoelectric micromechanical force-measuring element (PMFE). Step 102 can additionally include generating, by a second transducer 24, second signals in response to the perturbation. Step 102 can include generating, by each respective transducer (the transducers can number more than two), respective signals in response to the perturbation at the cover member 14. The respective signals can represent a measurement of a measurable characteristic, such as temperature, capacitance, strain, and inductance.

Step 104 includes obtaining, by the microcontroller 30, first data from the first signals. Step 104 can include receiving, by the microcontroller 30, the first signals from the first transducer 22, and carrying out any additional data processing to obtain the first data from the first signals. In implementations in which there is a second transducer 24 which generates second signals, step 104 can additionally include obtaining, by the microcontroller 30, second data from the second signals. In implementations in which there are signals from additional transducers, step 104 can additionally include obtaining, by the microcontroller 30, data from the respective signals.

Step 106 includes determining, by the microcontroller 30, user inputs in accordance with the respective data. Step 106 can include determining, by the microcontroller 30, user inputs in accordance with at least the first data. In implementations in which the microcontroller obtains second data from the second signals, step 106 can include determining, by the microcontroller 30, the user inputs in accordance with at least the first data and the second data. In some implementations, step 106 can include determining, by the microcontroller 30, the user inputs in accordance with at least the first data, the second data, and additional data. In some implementations, step 106 can include determining, by the microcontroller 30, the user inputs in accordance with at least the first data and additional data. The additional data can include state information.

Step 108 includes determining user feedback data in accordance with at least the user inputs. In some implementations, the determining of the user feedback data may be carried out by the microcontroller 30. The microcontroller 30 may be configured to determine the user feedback data in accordance with at least the user inputs. In some implementations, the determining of user feedback data includes executing, by a host processor 94, an integrated virtual button software code to (a) receive the user inputs from the microcontroller 30, (b) determine the user feedback data in accordance with at least the user inputs, and (c) transmit the user feedback data to the microcontroller 30 and/or the first driver circuit 50 (as well as to the second, third, and additional driver circuits 60, 70, etc., as appropriate). The user inputs and the user feedback data can be transmitted over a bus. In some implementations, the bus is selected from: I$^2$C bus, LIN bus, CAN bus, SPI bus, and UART bus.

Step 110 includes generating, by the first driver circuit 54, a first user feedback signal in accordance with the user feedback data. In implementations that include a second driver circuit 64, step 110 additionally includes generating, by the second driver circuit 64, a second user feedback signal in accordance with the user feedback data. In implementations that include a third driver circuit 74, step 110 additionally includes generating, by the third driver circuit 74, a third user feedback signal in accordance with the user feedback data. In implementations that include an additional driver circuit, step 110 additionally includes generating, by the additional driver circuit, an additional user feedback signal in accordance with the user feedback data.

Step 112 includes emitting, by a first actuator, a haptic signal and/or a first audio signal when driven by the first user feedback signal. In some implementations, the first actuator may emit a haptic signal when driven by the first user feedback signal. In some implementations, the first actuator may emit a first audio signal when driven by the first user feedback signal. In some implementations, the first actuator may emit a haptic signal and a first audio signal, such that the first user feedback signal may include a signal for driving haptic feedback and another signal for driving audio feedback. In some implementations, the first actuator may emit a visible light signal when driven by the first user feedback signal. In implementations that include a second actuator 60 (and a second driver circuit 64), step 112 may include emitting, by the second actuator 60, a second audio signal or a visible light signal when driven by the second user feedback signal. In some implementations, the first actuator emits the first audio signal, the second actuator emits the second audio signal, and the second audio signal is of a higher frequency than the first audio signal (e.g., the first actuator is a voice coil motor, and the second actuator is a speaker). In some implementations, the second actuator 60 may include a speaker, a light source, or a display. In implementations that include a third actuator 70 (and a third driver circuit 74), step 112 may include emitting, by the third actuator 70, a visible light signal when driven by the third user feedback signal. In some implementations, the third actuator may include a light source or a display.

Figure 3:
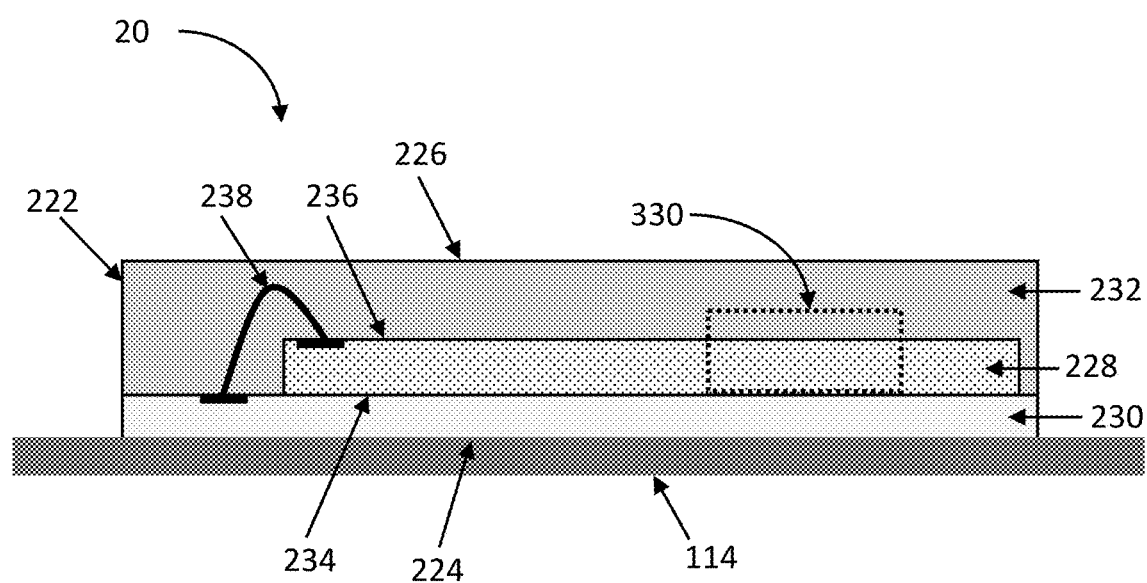
FIG. 3 is a schematic cross-sectional view of a transducer IC.

The transducer IC 20 is shown in greater detail in FIG. 3. FIG. 3 is a cross-sectional view of a transducer IC 20. Transducer IC 20 is shown encased in a package 222, with a top surface 226 and an electrical interconnection surface (bottom surface) 224. In the example shown, the transducer IC 20 is mounted to a circuit substrate 114 via the electrical interconnection surface 224. The electrical interconnection surface can also function as a mechanical coupling surface, for mechanically coupling to a cover member. The transducer IC 20 includes a package substrate 230, semiconductor die (semiconductor chip) 228 mounted to the package substrate 230, and an encapsulating adhesive 232, such as an epoxy adhesive. In the example shown in FIG. 3, after the semiconductor die 228 is mounted to the package substrate 230, wire bond connections 238 are formed between the die 228 and the package substrate 230. Then the entire assembly including the die 228 and the package substrate 230 is molded (encapsulated) in the encapsulating adhesive 232. In some implementations, it is preferable that the transducer IC have lateral dimensions no greater than 10 mm by 10 mm. In the example shown, the wire bond connection 238 is formed between the top surface 236 of the semiconductor die 228 and the package substrate 230. Alternatively, electrical interconnections can be formed between the bottom surface 234 of the semiconductor die 228 and the package substrate 230. The semiconductor die 228 consists of an application-specific integrated circuit (ASIC) portion and a micro-electromechanical systems (MEMS) portion. A selected portion 330 of the semiconductor die 228 is shown in cross-section in FIG. 4.

Figure 4:
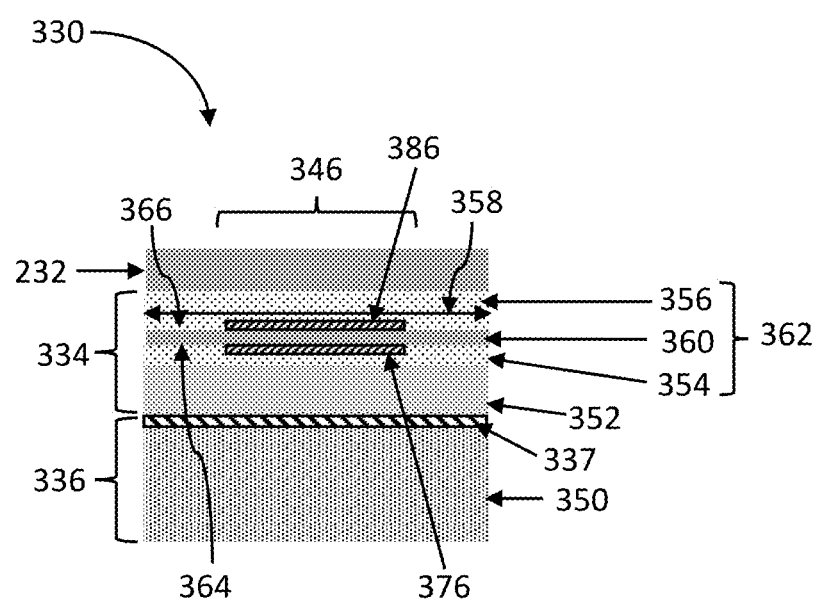
FIG. 4 is a schematic cross-sectional view of a certain portion of the transducer IC of FIG. 3.

FIG. 4 is a schematic cross-sectional view of a portion 330 of the transducer IC 20 of FIG. 3. In the example shown in FIG. 4, the solid-state transducer includes a PMFE 346. The semiconductor die 228 includes a MEMS portion 334 and an ASIC portion 336 underneath the PMFE 346. Also shown is an encapsulating adhesive 232 that is above the PMFE 346. The ASIC portion 336 consists of a semiconductor substrate 350 and signal processor 337 thereon or therein. Typically, the semiconductor substrate is a silicon substrate, but other semiconductor substrates such as silicon-on-insulator (SOI) substrates can also be used.

In the example shown in FIG. 4, the MEMS portion 334 includes a PMFE 346. The MEMS portion 334 includes a thin-film piezoelectric stack 362 overlying the semiconductor substrate 350. The thin-film piezoelectric stack 362 includes a piezoelectric layer 360, which is a layer exhibiting the piezoelectric effect. Suitable materials for the piezoelectric layer 360 are aluminum nitride, scandium-doped aluminum nitride, polyvinylidene fluoride (PVDF), lead zirconate titanate (PZT), $K_xNa_{1-x}NbO_3$ (KNN), quartz, zinc oxide, lithium niobate, and $Bi_{0.5}Na_{0.5}TiO_3$ (BNT), for example. For example, the piezoelectric layer is a layer of aluminum nitride having a thickness of approximately 1 μm. The piezoelectric layer 360 has a top major surface 366 and a bottom major surface 364 opposite the top major surface 366. In the example shown, the thin-film piezoelectric stack 362 additionally includes a top mechanical layer 356, attached to or adjacent to (coupled to) top major surface 366, and a bottom mechanical layer 354, attached to or adjacent to (coupled to) bottom major surface 364. In the example shown, the thickness of the top mechanical layer 356 is greater than the thickness of the bottom mechanical layer 354. In other examples, the thickness of the top mechanical layer 356 can be smaller than the thickness of the bottom mechanical layer 354. Suitable materials for the mechanical layer(s) are silicon, silicon oxide, silicon nitride, and aluminum nitride, for example. Suitable materials for the mechanical layer(s) can also be a material that is included in the piezoelectric layer 360, which in this case is aluminum nitride. In the example shown, the top mechanical layer and the bottom mechanical layer contain the same material. In other examples, the top mechanical layer and the bottom mechanical layer are of different materials. In other examples, the top mechanical layer or the bottom mechanical layer can be omitted. The mechanical layer(s) adjust the mechanical properties of the thin-film piezoelectric stack 362. When coupled to the cover member, the transducer IC 20 is preferably oriented such that the piezoelectric layer 360 faces toward the cover member 14. For example, the transducer IC 20 is oriented such that the piezoelectric layer 360 and the cover member 14 are approximately parallel.

For ease of discussion, only one PMFEs is shown in FIG. 4. However, a transducer IC 20 may contain multiple PMFEs. The PMFEs are located at respective lateral positions along the thin-film piezoelectric stack 362. An insulating support layer 352 supports the thin-film piezoelectric stack. Suitable materials for the support layer 352 are silicon, silicon nitride, and silicon oxide, for example. Suitable materials for the support layer 352 can also be a material that is included in the piezoelectric layer 360, which in this case is aluminum nitride.

In the example shown in FIG. 4, each PMFE 346 includes a respective portion of the thin-film piezoelectric stack 362. Each PMFE 346 includes a first PMFE electrode 376 positioned on a first side (bottom surface) 364 of the piezoelectric layer 360 and a second PMFE electrode 386 positioned on a second side (top surface) 366 opposite the first side. The first PMFE electrode 376 and the second PMFE electrode 386 are positioned on opposite sides of the piezoelectric layer 360. In each PMFE 346, the first PMFE electrode 376, the second PMFE electrode 386, and the portion of the piezoelectric layer 360 between them constitute a piezoelectric capacitor. The PMFEs are coupled to the signal processor 337 of the ASIC portion 336.

In operation, PMFE 346 is configured to output voltage signals between the PMFE electrodes (376, 386) in accordance with a time-varying strain at the respective portion of the piezoelectric layer between the PMFE electrodes (376, 386) resulting from a low-frequency mechanical deformation. PMFEs can measure low-frequency deformation corresponding to a repetitive finger press (e.g., up to about 10 Hz or perhaps up to about 100 Hz) as well as mechanical vibration at higher frequencies of up to about 10 kHz and up to a about 20 kHz. Therefore, in the context of PMFEs, low-frequency mechanical deformation can mean mechanical deformation of up to about 20 kHz. The low-frequency mechanical deformation can be caused by a finger pressing against or tapping at outer surface of the cover member 14, to which the transducer IC 20 is directly or indirectly attached (mechanically coupled). The PMFE 346 is electronically coupled to the signal processor 337. The signal processor is configured to read at least some of the PMFE voltage signals. By amplifying and processing the voltage signals from the PMFE at the signal processor, the strain that results from the mechanical deformation of the piezoelectric layer can be measured.

Typically, the low-frequency deformation is induced by perturbation (e.g., finger press) which is not repetitive or is repetitive having a repetition rate of 100 Hz or less, or 10 Hz or less. These repetition rates correspond to the repetition rates of a repetitive touch excitation, e.g., a finger repeatedly pressing against or tapping at a cover member. Illustrative force data measured during a repetitive touch event (finger touching and pressing the cover member repeatedly) is shown in FIGS. 6 and 7.

Figure 5:
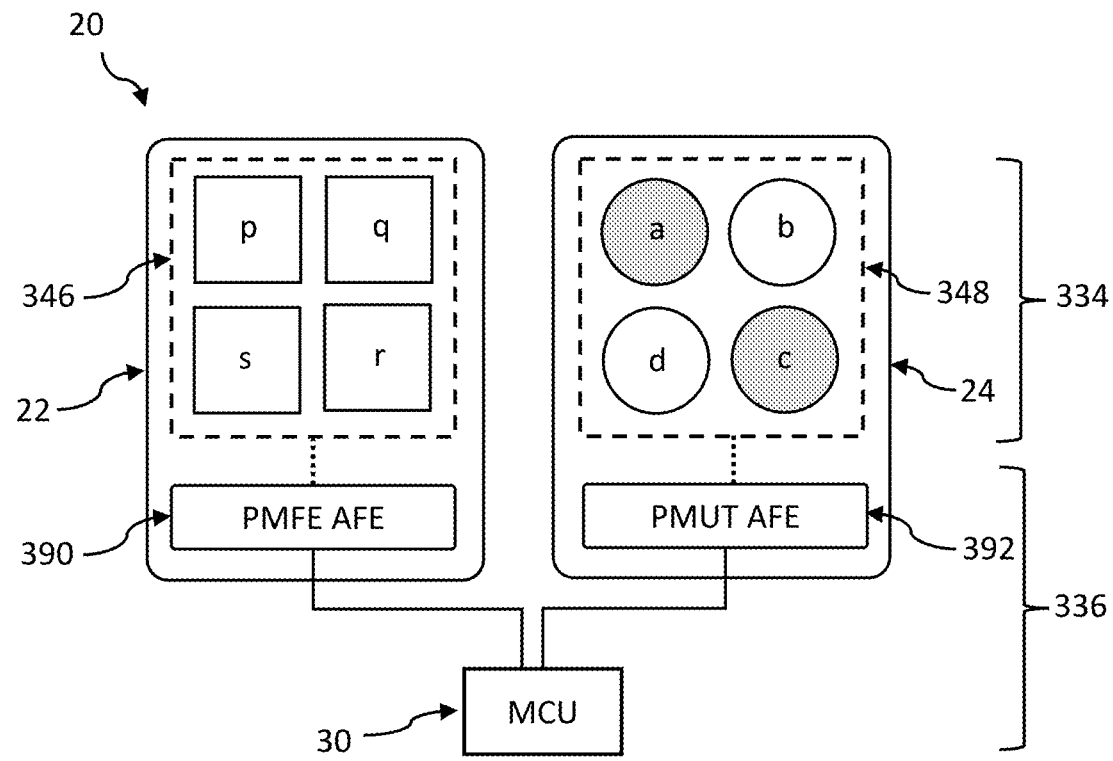
FIG. 5 is an electronics block diagram of a transducer IC.

FIG. 5 is an electronics block diagram of one implementation of transducer IC 20, including a MEMS portion 334 and ASIC portion 336. In the example shown, transducer IC 20 includes solid-state transducers 22, 24. The first solid-state transducer 22 includes PMFEs 346 (four PMFEs are shown, labeled p, q, r, and s). The second solid-state transducer 24 includes PMUTs 348 (four PMUTs are shown, labeled a, b, c, and d). For example, some of the PMUTs can be configured to be ultrasound transmitters (e.g., PMUTs labeled a and c) and some of the PMUTs can be configured to be ultrasound receivers (e.g., PMUTs labeled b and d). The PMUT transmitters would transmit ultrasound signals toward the cover member 14. Some of the ultrasound signals would be reflected at the cover member. The PMUT receivers would receive the ultrasound signals coming back from the cover member 14. For example, at least some of the ultrasound signal can be absorbed by a finger touching and/or pressing the cover member, thereby causing a change in the ultrasound signal coming back to the PMUTs from the cover member.

In the example shown in FIG. 5, the PMFEs 346 are connected to the PMFE analog front-end portion 390 and the PMUTs 348 are connected to the PMUT AFE portion 392. Each AFE portion 390, 392 includes circuits for amplifying, conditioning, and digitizing (e.g., amplifier, analog-to-digital converter (ADC)) the electrical signals from the PMFEs 346 and the PMUTs 348, respectively. In addition, the PMUT AFE can include driver circuitry for driving the PMUT transmitters. The MEMS portion 334 includes the PMFEs 346 and the PMUTs 348. In some implementations, the PMFEs 346 and PMUTs 348 can be formed at respective lateral positions along a piezoelectric stack 362. The ASIC portion 336 (the signal processor portion 337) includes the PMFE AFE portion 390, the PMUT AFE portion 392, and MCU 30.

Figure 6:
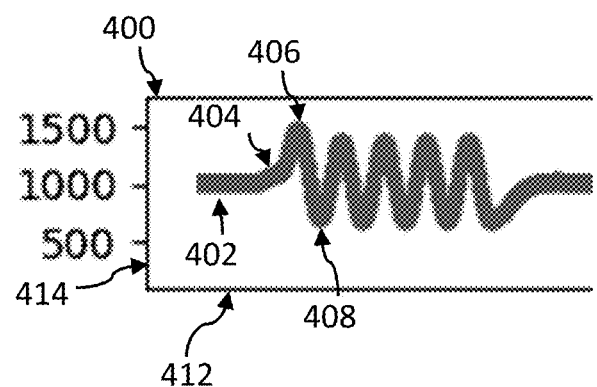
FIGS. 6 and 7 are graphical plots of strain data (representing strain signals) obtained from a piezoelectric micromechanical force-measuring elements (PMFEs) of a transducer IC in response to a perturbation at the cover member.
Figure 7:
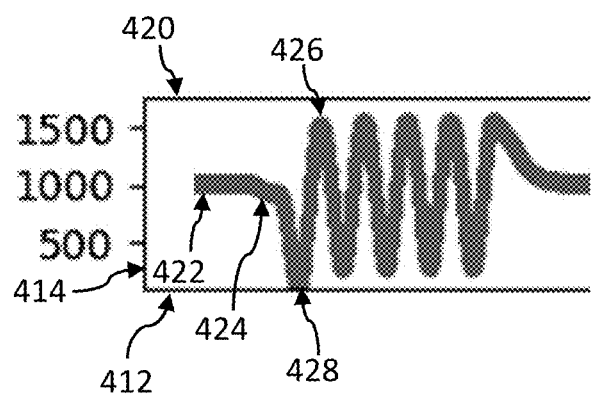

FIGS. 6 and 7 show some examples of PMFE data. FIG. 6 is graphical plot 400 of PMFE signals (PMFE data) obtained from a solid-state transducer (e.g., first solid-state transducer 22) in response to a time-varying applied force imparted at a force-imparting point (e.g., a first point on cover member 14). For example, these PMFE signals correspond to PMFE voltage signals, after amplification, conditioning, and digitization (e.g., an output from PMFE AFE 390). The time-varying applied force consists of a finger repetitively pressing at the first point of the cover member 14 five times. Plot 400 has a horizontal axis 412 which shows time t and a vertical axis 414 which shows force (PMFE data), expressed in LSB. For example, a time duration of plot 400 is 10 seconds. Before the application of the time-varying applied force, the PMFEs are in a quiescent state (plot section 402). For example, the PMFE might be in a quiescent state if there is no deformation of the cover member. As the time-varying applied force begins, the PMFE data show a positive slope (plot section 404) and then reaches a maximum 406, corresponding to strain of a first polarity at the PMFEs. For example, this corresponds to the PMFEs under tension. As the pressure at the force-imparting point is released, the PMFE data decreases from a maximum 406 to a minimum 408. Local maxima are reached five times, corresponding to repetitively pressing at the force-imparting point five times. A characteristic amplitude of the PMFE data can be defined to be a difference between a local maximum 406 and a local minimum 408. Alternatively, a characteristic amplitude of the PMFE data can be defined to be a difference between a global maximum and a global minimum, within a predetermined time window such as shown in FIG. 6. The characteristic amplitude of the PMFE data can also be referred to as a magnitude of the PMFE voltage signals. When the characteristic amplitude exceeds a trigger threshold, one can determine that a finger press at the cover member has occurred.

FIG. 7 is graphical plot 420 of PMFE signals (PMFE data) obtained from a solid-state transducer (e.g., first solid-state transducer 22) in response to a time-varying applied force imparted at another force-imparting point (e.g., a second point on cover member 14). For example, this force-imparting point is different from the force-imparting point of FIG. 6. This force-imparting point can be laterally displaced from and/or remote from the first solid-state transducer. For example, a time duration of plot 420 is 10 seconds. Before the application of the time-varying applied force, the PMFEs are in a quiescent state (plot section 422). As the time-varying applied force begins, the PMFE data show a negative slope (plot section 424) and then reaches a local minimum 428, corresponding to strain of a second polarity at the PMFEs. This corresponds to the PMFEs under compression. As the pressure at the force-imparting point is released, the PMFE data increases from a local minimum 428 to a local maximum 426. Local minima are reached five times, corresponding repetitively pressing against the force-imparting point five times. A characteristic amplitude of the PMFE data can be defined to be a difference between the local maximum 426 and the local minimum 428. Alternatively, a characteristic amplitude of the PMFE can be defined to be a difference between a global maximum and a global minimum, within a predetermined time window such as shown in FIG. 7. In some implementations, if the characteristic amplitude exceeds the trigger threshold but the polarity of the PMFE waveform is different from that expected for a finger press at a force-imparting point on the cover member close to the solid-state transducer, one can determine that a finger press at the expected location (e.g., a point sufficiently close to the solid-state transducer) has not occurred.

Figure 8:
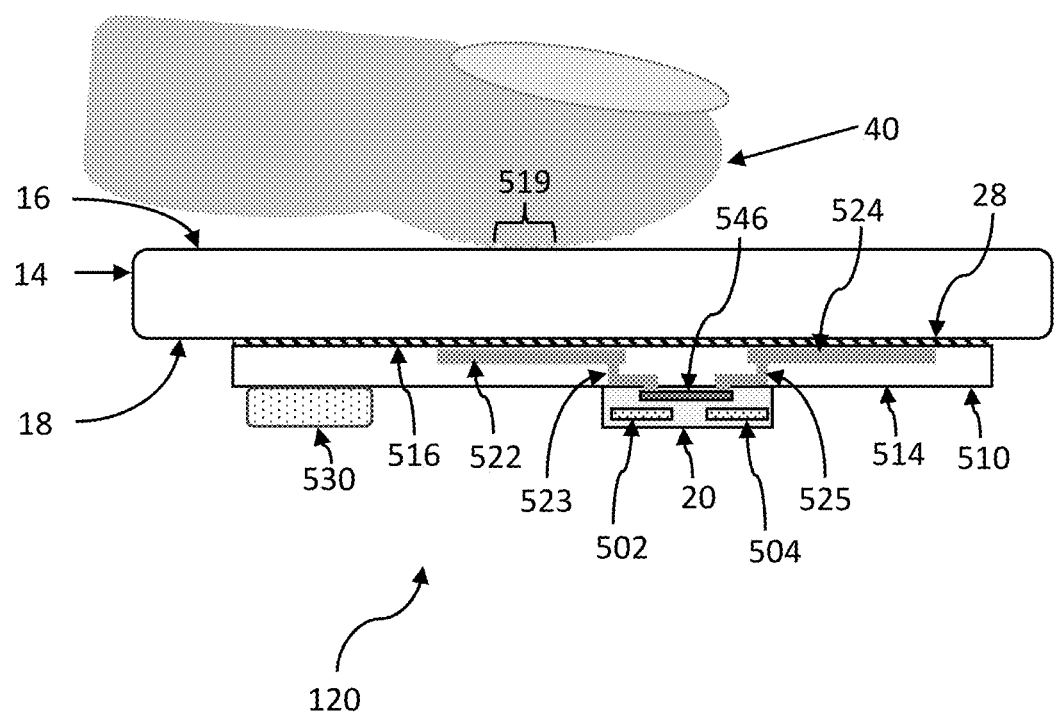
FIG. 8 is a schematic view of a portion of an integrated virtual button system or module, illustrating the use of capacitance-measuring sensor electrodes.

FIG. 8 is a schematic view of a portion 120 of an integrated virtual button system (or an integrated virtual button module, as appropriate), showing one implementation of capacitance-measuring sensor electrodes. For ease of discussion, other portions of the integrated virtual button system (or integrated virtual button module) have been omitted from FIG. 8. The system/module portion 120 includes a transducer IC 20. In the example shown, the transducer IC 20 includes piezoelectric micromechanical force-measuring elements (PMFEs) 502, 504. For example, each PMFE 502, 504 can be configured to output voltage signals in accordance with a time-varying strain at each respective PMFE. The system/module portion 120 also includes a cover member 14 and an elastic circuit board substrate 510 interposed between the transducer IC 20 and the cover member 14. The elastic circuit board substrate 510 is mechanically coupled to the cover member 14 and to the transducer IC 20. The transducer IC 20 is mounted to and electrically connected to the elastic circuit board substrate 510. In the example shown, the transducer IC 20 is mounted to and electrically connected to the elastic circuit board substrate 510 at its first surface (bottom surface) 514. For example, there are sensor electrodes 522, 524 on or in the elastic circuit board substrate 510. An electrical wiring 523 electrically connects sensor electrode 522 to a circuit (signal processor 546) in the transducer IC 20. An electrical wiring 525 electrically connects sensor electrode 524 to the signal processor 546. The transducer IC 20 can be attached to the elastic circuit board substrate by solder-bonding, for example. Additionally, other integrated circuits (IC), electrical components, and electromechanical components (e.g., a motor) can be mounted to the elastic circuit board substrate 510 at its bottom surface 514. These other components are collectively labeled as 530 in FIG. 8. In the implementation shown in FIG. 8, there is first solid-state transducer comprising the PMFEs 502, 504 and a second solid-state transducer comprising the sensor electrodes 522, 524.

The cover member 14 has an exposed outer surface 16 and an inner surface 18 opposite the outer surface. The cover member 14 should be robust but should be sufficiently deformable such that a deformation of the cover member is transmitted to the PMFEs (502, 504) in the transducer IC 20. FIG. 8 shows an example of a contact point 519, which is an area where the finger 40 contacts the outer surface 16 of the cover member 14 when touching, tapping, and/or pressing. The cover member 14 can be a robust material that deforms when pressed by the finger 40. Examples of such robust materials are wood, glass, metal, plastic, leather, fabric, and ceramic. However, for user input systems (e.g., integrated virtual button system, integrated virtual button module) that are configured to measure self-capacitance or mutual capacitance, the cover member should be electrically non-conducting. In this case, the use of metal can be avoided. The cover member 14 could also be a composite stack of any of the foregoing materials. The elastic circuit board substrate 510 is adhered to or attached to the inner surface 18 of the cover member 14 by a layer of adhesive 28, for example. The choice of adhesive 28 is not particularly limited if the elastic circuit board substrate 510 remains attached to the cover member. The adhesive 28 could be double-sided tape, pressure sensitive adhesive (PSA), epoxy adhesive, or acrylic adhesive, for example. The adhesive 28 is applied between the inner surface 18 of the cover member 14 and the second surface (top surface) 516 of the elastic circuit board substrate 510 opposite the bottom surface 514. The cover member 14 undergoes a primary mechanical deformation in response to forces imparted at the cover member. For example, forces are imparted at the cover member if the finger 40 touches and/or presses the cover member 14 at a contact point 519 (in such a case, contact point 519 is also regarded as a force-imparting point). The elastic circuit board substrate 510 transmits a portion of the primary mechanical deformation to the transducer IC 20 resulting in a concurrent secondary mechanical deformation of the transducer IC 20. Each PMFE (502, 504) is configured to output voltage signals in accordance with a time-varying strain at the respective PMFE resulting from the secondary mechanical deformation.

Figure 9:
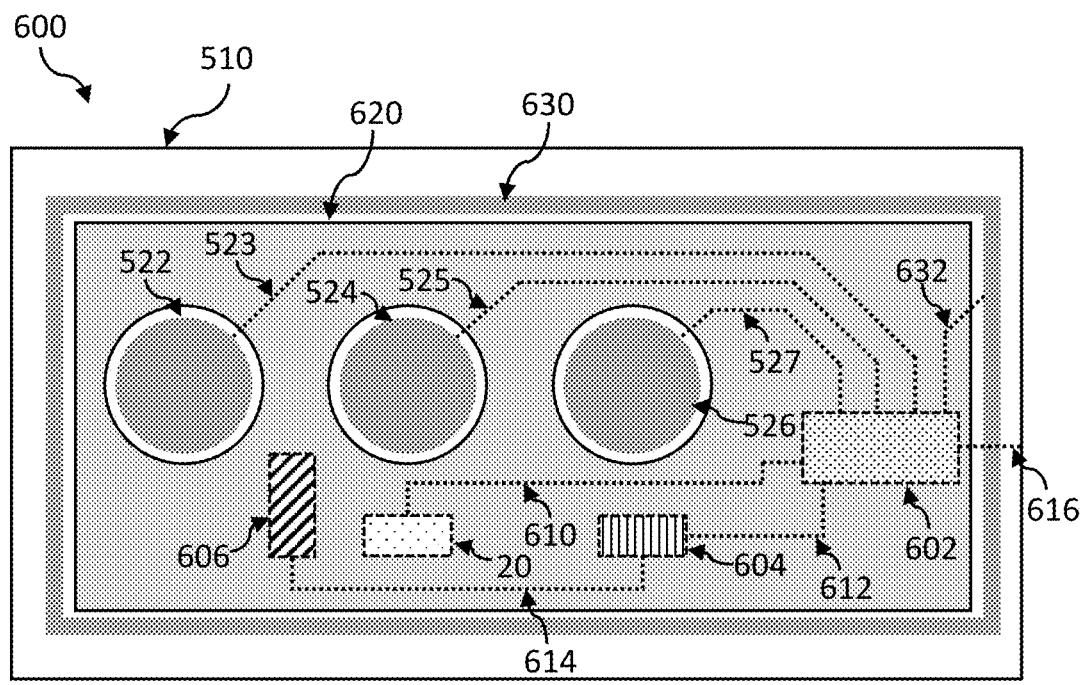
FIGS. 9 and 10 are schematic plan views of portions of integrated virtual button systems or modules, showing the implementations of capacitance-measuring sensor electrodes on circuit board substrates.
Figure 11:
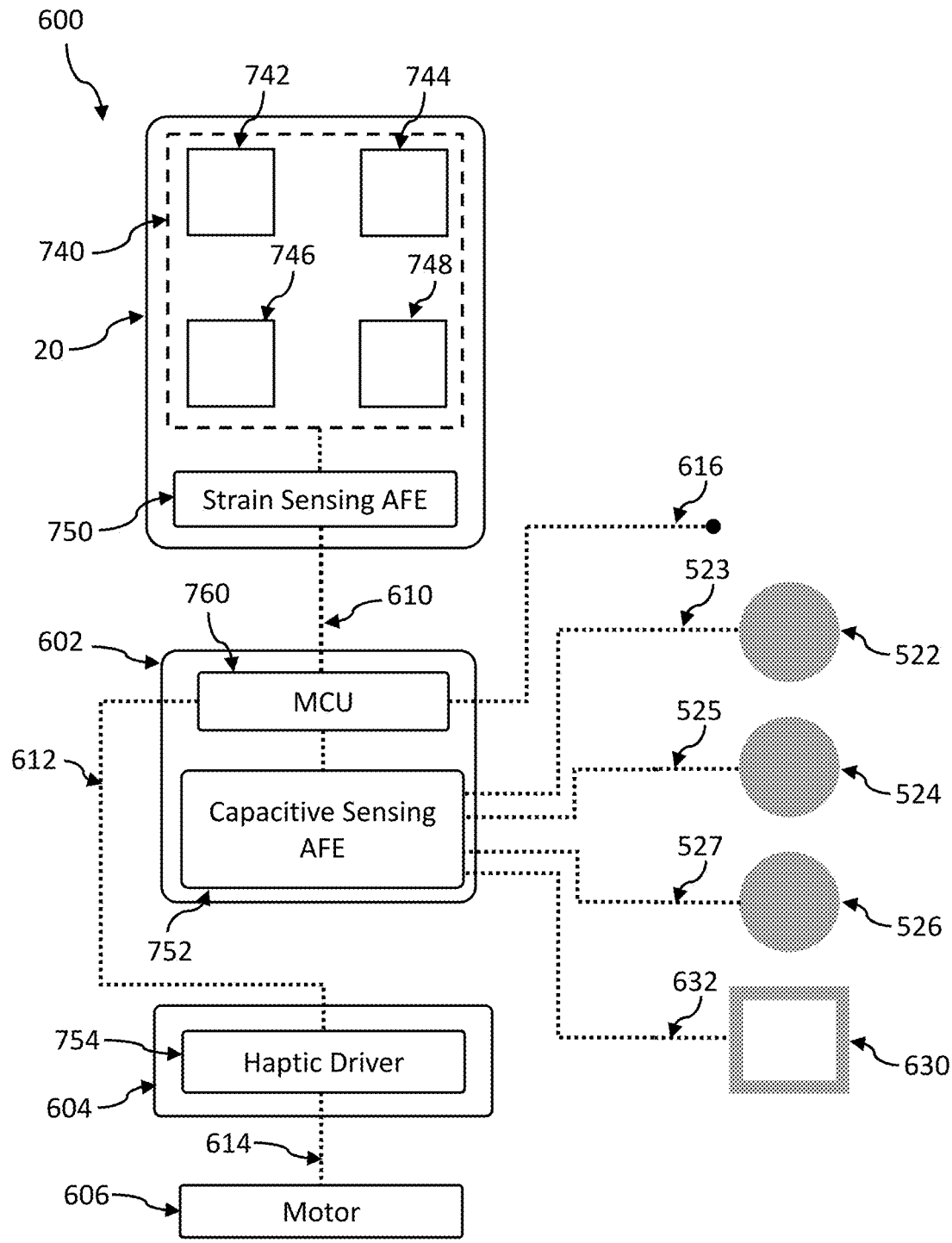
FIGS. 11 and 12 are schematic block diagrams of the system/module portions of FIGS. 9 and 10, respectively.

FIG. 9 is a plan view of a portion 600 of an integrated virtual button system or module including capacitance-measuring sensor electrodes as implemented on or in an elastic circuit board substrate 510. FIG. 11 corresponds to FIG. 9 and is a schematic block diagram of system portion 600. Sensor electrodes 522, 524, 526 are positioned on or in the elastic circuit board substrate 510. The sensor electrodes 522, 524, 526 are connected, via respective electrical wiring 523, 525, 527, to a system-on-a-chip (SoC) 602. SoC 602 includes a capacitive sensing analog front-end (AFE) circuit 752 and a microcontroller (MCU) 760. The electrical wiring 523, 525, and 527 electrically connect the respective sensor electrodes 522, 524, 526 to the capacitive sensing AFE 752. There is also a proximity sensor electrode 630 positioned on or in the elastic circuit board substrate 510. The proximity sensor electrode 630 is connected, via electrical wiring 632, to the capacitive sensing AFE 752 of the SoC 602. In the example shown, the proximity sensor electrode 630 encloses the sensor electrodes (522, 524, 526). For example, the proximity sensor electrode encloses an area that is greater than an area of one of the sensor electrodes by a factor of at least 2. Preferably, there is a grounded electrode 620 which separates the sensor electrodes (522, 524, 526) and the proximity sensor electrode (630) from each other. The sensor electrodes (522, 524, 526), the proximity sensor electrode (630), and the grounded electrode (620) can be included in one layer ("electrode layer") of metal in the circuit board 510. The illustrated wiring 523, 525, 527, 610, 612, 614, 632 can be included in a wiring layer, different from the electrode layer.

In the example shown, the system/module portion 600 additionally includes a transducer IC 20, a haptic driver IC 604, and a haptic motor 606, mounted to the bottom surface 514 of the elastic circuit board substrate 510. The haptic driver IC 604 and haptic motor 606 correspond to other components 530 in FIG. 8. The other components 530 can include other actuators, as discussed herein. The haptic driver IC 604 includes a haptic driver circuit 754. There is an electrical wiring 614 between the haptic driver circuit 754 and the haptic motor 606. The haptic motor 606 is driven by the haptic driver circuit 754. Since the haptic motor 606 is mounted to the elastic circuit board substrate 510 and the elastic circuit board substrate 510 is mechanically coupled to the cover member 14, the haptic motor 606 is mechanically coupled to the cover member 14. The haptic motor 606 is an example of an actuator (e.g., 50, 60, 70 in FIG. 1) and the haptic driver circuit 754 is an example of driver circuit (e.g., 54, 64, 74 in FIG. 1).

In the implementation shown in FIGS. 9 and 11, the transducer IC 20 includes a micro-electro-mechanical systems (MEMS) portion 740 and a strain-sensing AFE 750 (FIG. 11). The strain-sensing AFE 750 is included in the application-specific integrated circuit (ASIC) portion of the transducer IC 20. In the example shown, the MEMS portion 740 includes 4 piezoelectric micromechanical force-measuring elements (PMFEs) 742, 744, 746, 748. In the example shown, the strain-sensing AFE 750 is configured to read at least some of the PMFE voltage signals. Strain-sensing AFE 750 includes analog signal processing circuitry (including amplifiers) for conditioning the voltage signals from the PMFEs. There is an electrical wiring 610 between the strain-sensing AFE 750 and the MCU 760. There is an electrical wiring 612 (e.g., a portion of a bus) between the MCU 760 and the haptic driver circuit 754. The strain-sensing AFE 750, the MCU 760, the capacitive-sensing AFE 752, and the haptic driver 754 can be referred to collectively as a signal processor. There can be electrical wiring 616 (e.g., bus wiring) between the MCU 760 and other component(s). The other component can be a microprocessor, or a microcontroller located off the elastic circuit board substrate 510. For example, the other component can be a host processor 94 of a host system 90 (FIG. 1). In this case, MCU 760 and wiring 616 would correspond to MCU 30 and bus (e.g., 36, 38, 96) of FIG. 1, respectively.

Capacitive-sensing AFE 752 includes analog signal processing circuitry (including amplifiers) for conditioning the analog signal from the sensor electrodes (522, 524, 526) and/or the proximity sensor electrode(s) 630. Herein, the sensor electrodes and the proximity sensor electrodes may sometimes be referred to collectively as "sensor electrodes." After signal conditioning, capacitance signals from the sensor electrodes and/or the proximity sensor electrode(s) can be processed by the MCU 760. For each of the sensor electrodes, the signal processor (e.g., SoC 602, or in particular, MCU 760) is configured to: (1) measure a capacitance between the respective sensor electrode and its surrounding environment (self-capacitance data) and/or (2) measure a capacitance between the respective sensor electrode and an adjacent one of the sensor electrodes (mutual capacitance data). Similarly, for each proximity sensor electrode, the signal processor is configured to measure a capacitance between the proximity sensor electrode and its surrounding environment (proximity self-capacitance data).

Preferably, the capacitive-sensing AFE 752 is configured such that the proximity sensor electrode 630 has greater sensitivity to capacitance changes than do the sensor electrodes 522, 524, and 526. Accordingly, the proximity sensor electrode can be used to measure capacitance changes at the proximity sensor electrode 630 caused by an object (e.g., a finger) approaching but not yet touching the cover member 14. On the other hand, the sensor electrodes can be used to measure capacitance changes at the sensor electrodes 522, 524, 526 caused by an object (e.g., a finger) touching the cover member 14. Preferably, the signal processor (e.g., SoC 602, or in particular, MCU 760) is configured to detect proximity of an object to the cover member 14 when at least the following condition is satisfied: a magnitude of the proximity self-capacitance data exceeds a proximity self-capacitance threshold. For example, the proximity self-capacitance threshold can be predetermined (e.g., determined at the time of programming the signal processor) or algorithmically determined (e.g., determined and changed from time to time by an algorithm). Additionally, the signal processor can be configured to measure the self-capacitance data and/or the mutual capacitance data when the signal processor detects proximity of the object.

Figure 10:
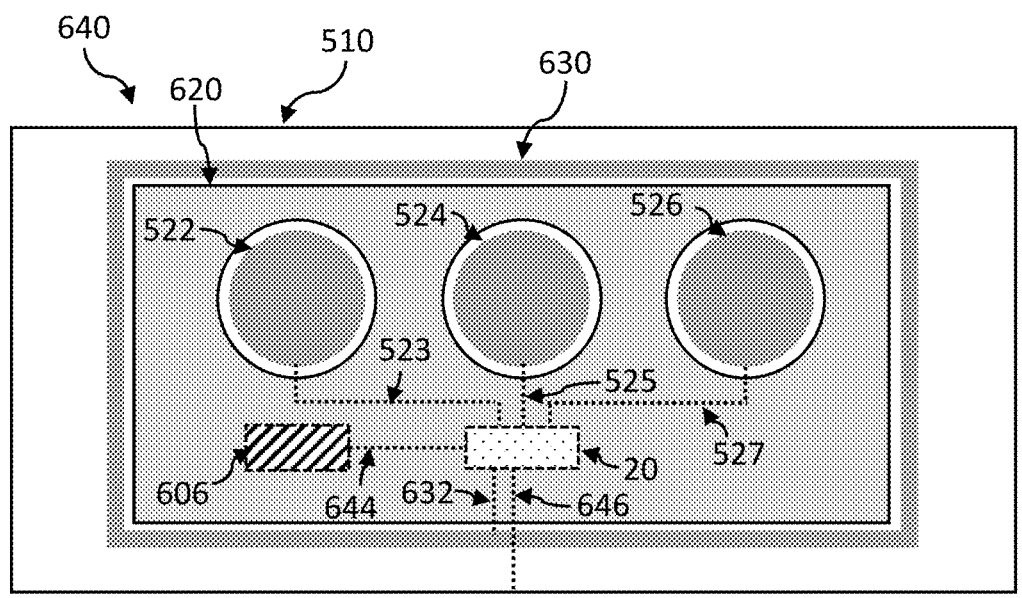
Figure 12:
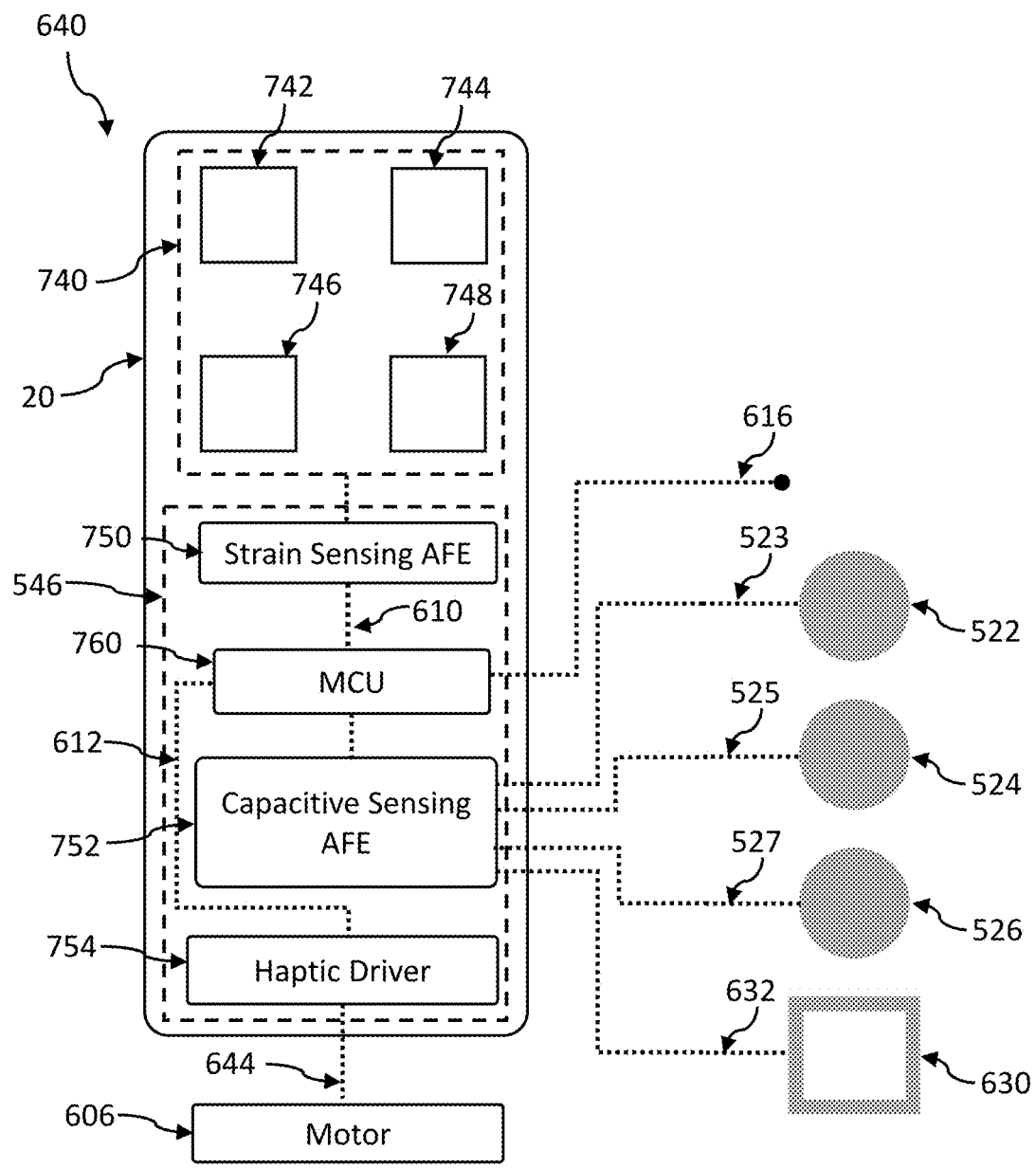

FIG. 10 is a plan view of a portion 640 of an integrated virtual button system or module including capacitance-measuring sensor electrodes as implemented on or in an elastic circuit board substrate 510. FIG. 12 corresponds to FIG. 10 and is a schematic block diagram of system/module portion 640. The implementation of system/module portion 640 differs from the implementation of portion 600 in that the signal processor circuits are integrated into the transducer IC 20. In the example shown, the MCU 760, the capacitive-sensing AFE 752, and haptic driver circuit 754 are included in the transducer IC. The signal processor 546, including the strain-sensing AFE 750, the MCU 760, the capacitive-sensing AFE 752, and haptic driver circuit 754 are included in the transducer IC 20. Embodiments are possible in which a portion of the signal processor 546 is included in the transducer IC 20 or an entirety of the signal processor 546 is included in the transducer IC 20. It is possible for a portion or an entirety of the haptic driver 754 to be included in the transducer IC 20.

In the implementations shown in FIGS. 9, 10, 11, and 12, the first solid-state transducer includes the PMFEs (e.g., 742, 744, 746, 748) and the second solid-state transducer includes the capacitance-measuring sensor electrodes (e.g., 522, 524, 526, 630). The first transducer is mechanically coupled to the cover member and configured to generate first signals (PMFE signals) in response to a perturbation at the cover member. The second transducer is configured to generate second signals (capacitance readings from respective sensor electrodes) in response to the perturbation. The MCU obtains the first data from the first signals and the second data from the second signals. In some implementations, the second data comprise (1) capacitance between at least one of the sensor electrodes and its surrounding environment (self-capacitance data) and/or (2) capacitance between a first one of the sensor electrodes and a second one of the sensor electrodes (mutual capacitance data). In some implementations, the second data can include one or more of the following: (1) a position of user-induced perturbation at the cover member (perturbation position) in accordance with a map of the self-capacitance data; (2) a comparison of a magnitude of the self-capacitance data to a self-capacitance threshold; (3) a position of user-induced perturbation at the cover member (perturbation position) in accordance with a map of the mutual capacitance data; and (4) a comparison of a magnitude of the mutual capacitance data to a mutual capacitance threshold. These implementations are described hereinbelow.

Figure 13:
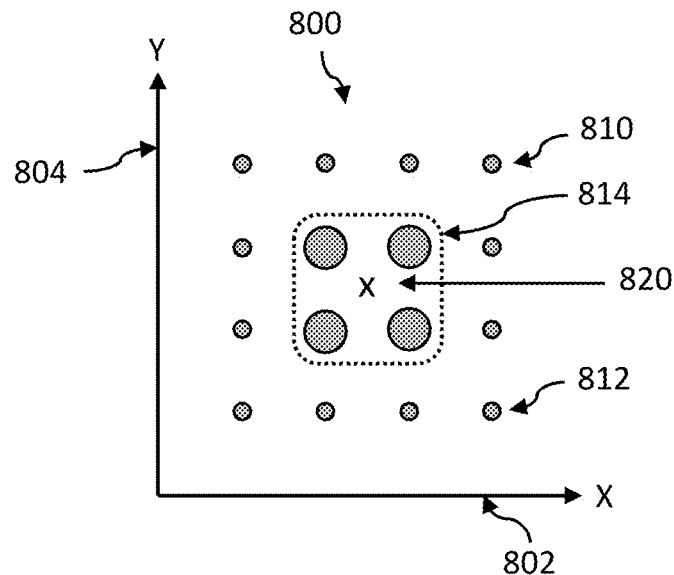
FIG. 13 is a map of capacitance data for a two-dimensional array of sensor electrodes.

FIG. 13 is a map 800 of capacitance data for a two-dimensional array of sensor electrodes. The sensor electrodes 810 (grey circles) are arranged in a two-dimensional array extending along the X-axis 802 and Y-axis 804. The map 800 can be a map of self-capacitance data of each of sensor electrodes or a map of mutual capacitance data between each of the sensor electrodes and an adjacent one of the sensor electrodes. The dimensions of the grey circles represent the magnitudes of the capacitance data. In the example shown, small capacitance values were measured at sensor electrodes at the small circles 812 and large capacitance values were measured at sensor electrodes at the large circles 814. Four adjacent sensor electrodes exhibited large capacitance values (814). The large capacitance data (self-capacitance or mutual capacitance) measured at the sensor electrodes 814 exceeded a capacitance threshold and the small capacitance data (self-capacitance or mutual capacitance) measured at the sensor electrodes 812 did not exceed a capacitance threshold. The magnitude of the capacitance data exceeding a capacitance threshold can be one of the conditions for the signal processor to detect a user-induced perturbation (e.g., finger positioned in close proximity to the contact point, finger touch, finger press & release, finger press & hold, multiple repetitions of finger press). For example, the capacitance threshold (self-capacitance or mutual capacitance) can be predetermined (e.g., determined at the time of programming the signal processor) or algorithmically determined (e.g., determined and changed from time to time by an algorithm).

Depending on geometrical factors such as the sizes of the sensor electrodes and the distances between the sensor electrodes, a typical human finger might overlap all four sensor electrodes 814 exhibiting large capacitance values, or a typical finger might contact the cover member at a point in between the sensor electrodes 814. If the map 800 is a map of self-capacitance data, the signal processor is configured to estimate a position of the user-induced perturbation at the cover member (perturbation position) in accordance with a map of the self-capacitance data. If the map 800 is a map of mutual capacitance data, the signal processor is configured to estimate a position of the user-induced perturbation at the cover member (perturbation position) in accordance with a map of the mutual capacitance data. For example, the signal processor can estimate the perturbation position to be point 820, indicated by symbol x, in between the large circles 814.

Figure 14:
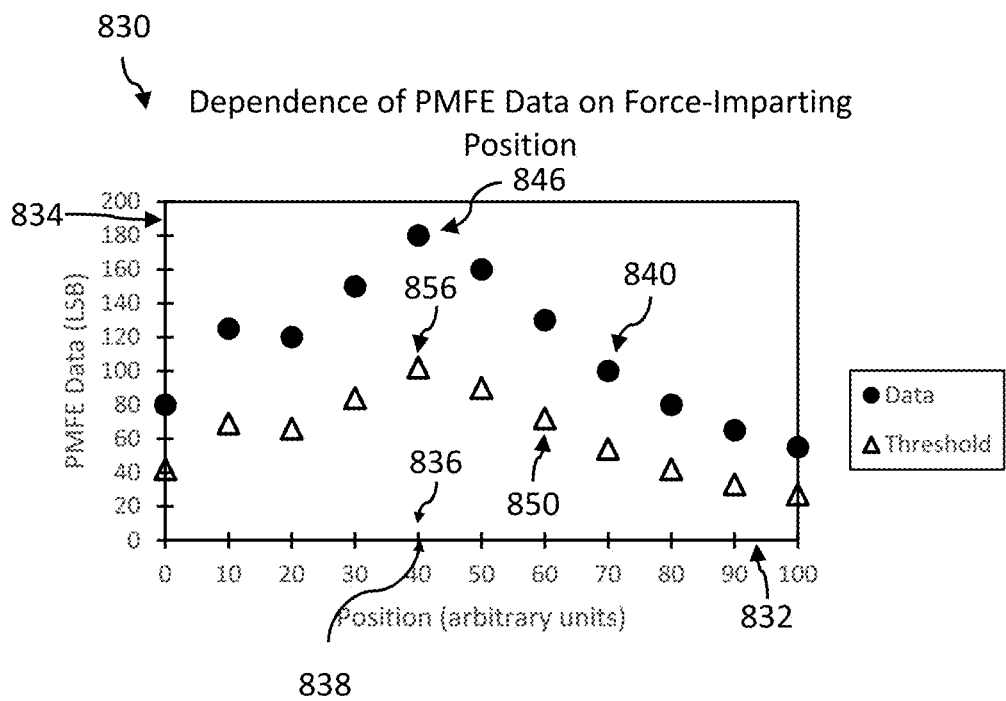
FIG. 14 is a graphical plot showing dependence of measured PMFE data on force-imparting position.

FIG. 14 is a graphical plot 830 showing dependence of PMFE data on force-imparting position (perturbation position in which a finger touches or presses the cover member). Plot 830 has an X-axis 832 showing force-imparting position (expressed in arbitrary units) and a Y-axis 834 showing PMFE data (expressed in LSB). The force-imparting position varied between 0 and 100 arbitrary units. At each force-imparting position, a standardized force is applied. The standardized force is a force corresponding to a typical press by a finger, such as 7.5 N. The PMFE from which the PMFE voltage signals were output was located at position 838, near 40 arbitrary units. The PMFE data 846 (black circles) are obtained by amplification, analog-to-digital conversion, and other signal processing of the PMFE voltage signals. The PMFE data 840 depend on the force-imparting point. The magnitude and/or the polarity of the PMFE data 840 can depend on a distance between the PMFE and the force-imparting point. The magnitude and/or the polarity of the PMFE data 840 can also depend on local mechanical properties of the cover member and the elastic circuit board substrate. Generally, the PMFE data 840 depend on the position of the force-imparting point, or the perturbation position. For example, PMFE data 846, corresponding to force-imparting point 836 (near 40 arbitrary units), has a greater magnitude than any of the other measured PMFE data 840. This force-imparting point 836 is closer than any of the other force-imparting points to the PMFE (at position 838).

Since the PMFE data under a standard imparted force varies depending on the force-imparting position, it is also possible to set a force threshold 856 (shown as white triangles) that varies in accordance with the force-imparting position. The magnitude of the PMFE voltage signals exceeding a force threshold can be one of the conditions for the signal processor to detect user-induced perturbation. For example, the force threshold can be predetermined (e.g., determined at the time of programming the signal processor) or algorithmically determined (e.g., determined and changed from time to time by an algorithm). If the self-capacitance is measured, the signal processor can be configured to detect a user-induced perturbation when at least the following conditions are satisfied: (1) a magnitude of the self-capacitance data exceeds a self-capacitance threshold and (2) a magnitude of the PMFE voltage signals exceeds a force threshold that varies in accordance with the force-imparting position. If the mutual capacitance is measured, the signal processor can be configured to detect a user-induced perturbation when at least the following conditions are satisfied: (1) a magnitude of the mutual capacitance data exceeds a mutual capacitance threshold and (2) a magnitude of the PMFE voltage signals exceeds a force threshold that varies in accordance with the force-imparting position.

Figure 15:
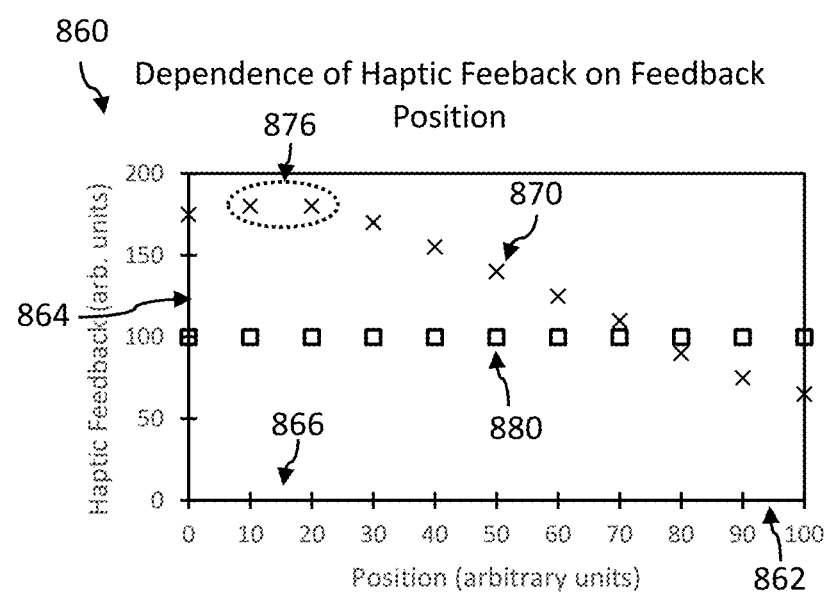
FIG. 15 is a graphic plot showing dependence of haptic feedback on feedback position (contact point).

FIG. 15 is a graphic plot 860 showing dependence of haptic feedback on haptic feedback position. Plot 860 has an X-axis 862 showing haptic feedback position (expressed in arbitrary units) and a Y-axis 864 showing a magnitude of haptic feedback (expressed in arbitrary units). The haptic feedback position is the contact point at which a finger contacts the cover member and senses the haptic feedback. The haptic feedback position varied between 0 and 224 arbitrary units. The haptic motor was located at position 866, near 15 arbitrary units. Two types of haptic feedback data are shown: position-independent haptic feedback 870 (shown as x's) and position-dependent haptic feedback 880 (shown as white squares). In the case of position-independent haptic feedback 870, the haptic driver drives the haptic motor at constant amplitudes. Since the haptic feedback position (contact point) varies and the distance between the haptic feedback position and the haptic motor position varies, the haptic feedback sensed by the finger varies. The haptic feedback is greatest at data points 876, which are closest to the haptic motor position 866. In the case of position-dependent haptic feedback 880, the haptic driver drives the haptic motor at amplitudes that vary in accordance with the contact point. In particular, the haptic driver can be configured to drive the haptic motor at varying amplitudes such that the haptic feedback is approximately constant regardless of haptic feedback position (contact point).

What is claimed is:

1. An integrated virtual button module, comprising:
   a first transducer comprising a transient strain-sensing element and configured to generate first signals;
   a microcontroller configured to obtain first data from the first signals and determine user inputs in accordance with at least the first data; and
   a first driver circuit configured to receive user feedback data and to generate a first user feedback signal in accordance with the user feedback data, the first driver circuit electronically couplable to a first actuator,
   wherein the first actuator comprises one of a haptic actuator, a speaker, a light source, and a display;
   wherein:
   the user feedback data are determined in accordance with at least the user inputs and state information; and
   the first actuator emits a first haptic signal, a first audio signal, or a first visible light signal when driven by the first user feedback signal.

2. The integrated virtual button module of claim 1, wherein the haptic actuator may be implemented as a voice coil motor.

3. The integrated virtual button module of claim 1, wherein the first actuator emits the first visible light signal, and the first visible light signal comprises visible light of varying colors and/or intensities, or visible information presented on a display.

4. The integrated virtual button module of claim 1, wherein the state information comprises information of operational states of the integrated virtual button module.

5. The integrated virtual button module of claim 1, wherein the microcontroller is configured to determine the user feedback data.

6. The integrated virtual button module of claim 1, wherein:
   the microcontroller is electronically couplable to a host processor of a host system via a bus; and
   the host processor is configured to determine the user feedback data when the microcontroller is electronically coupled to the host processor.

7. The integrated virtual button module of claim 6, wherein the bus is an I²C bus, a LIN bus, a CAN bus, an SPI bus, or a UART bus.

8. The integrated virtual button module of claim 6, wherein the state information comprises information of operational states of the host system.

9. The integrated virtual button module of claim 1, wherein the transient strain-sensing element is a piezoelectric micromechanical force-measuring element (PMFE).

10. The integrated virtual button module of claim 1, wherein:
    the integrated virtual button module comprises an integrated circuit; and
    the integrated circuit comprises the first transducer and the microcontroller.

11. The integrated virtual button module of claim 1, wherein:
    the integrated virtual button module additionally comprises a second transducer configured to generate second signals; and
    the microcontroller is configured to obtain second data from the second signals and determine the user inputs in accordance with at least the first data and the second data.

12. The integrated virtual button module of claim 11, wherein:
    the integrated virtual button module comprises an elastic circuit board substrate;
    the second transducer comprises one or more sensor electrodes positioned on or in the elastic circuit board substrate; and
    the second data comprise (1) capacitance between at least one of the sensor electrodes and its surrounding environment and/or (2) capacitance between a first one of the sensor electrodes and a second one of the sensor electrodes.

13. The integrated virtual button module of claim 11, wherein the second transducer comprises one or more piezoelectric micromechanical ultrasonic transducers (PMUTs).

14. The integrated virtual button module of claim 1, wherein:
    the integrated virtual button module additionally comprises a second driver circuit configured to generate a second user feedback signal in accordance with the user feedback data, the second driver circuit electronically couplable to a second actuator; and
    the second actuator emits a second haptic signal, a second audio signal, or a second visible light signal when driven by the second user feedback signal.

15. A system comprising:
    a cover member; and
    the integrated virtual button module of claim 1,
    wherein:
    the first transducer is mechanically coupled to the cover member and configured to generate the first signals in response to a perturbation at the cover member; and
    the integrated virtual button module is attached to an inner surface of the cover member via an adhesive.

16. The system of claim 15, wherein the adhesive comprises double-sided tape, pressure sensitive adhesive, epoxy adhesive, or acrylic adhesive.

17. An integrated virtual button system, comprising:
    a cover member;
    a first transducer comprising a transient strain-sensing element, the first transducer mechanically coupled to the cover member and configured to generate first signals in response to a perturbation at the cover member;
    a microcontroller configured to obtain first data from the first signals and determine user inputs in accordance with at least the first data;
    a first driver circuit configured to receive user feedback data and to generate a first user feedback signal in accordance with the user feedback data; and
    a first actuator electronically coupled to the first driver circuit;
    wherein the first actuator comprises one of a haptic actuator, a speaker, a light source, and a display;
    wherein:
    the user feedback data are determined in accordance with at least the user inputs and state information; and
    the first actuator emits a first haptic signal, a first audio signal, or a first visible light signal when driven by the first user feedback signal.

18. The integrated virtual button system of claim 17, wherein the haptic actuator may be implemented as a voice coil motor.

19. The integrated virtual button system of claim 17, wherein the state information comprises information of operational states of the integrated virtual button system.

20. The integrated virtual button system of claim 17, wherein the microcontroller is configured to determine the user feedback data.

21. The integrated virtual button system of claim 17, wherein:
the integrated virtual button system additionally comprises a host system comprising a host processor and a memory storing an integrated virtual button software code;
the host processor is electronically coupled to the microcontroller via a bus; and
the host processor is configured to execute the integrated virtual button software code to (a) receive the user inputs from the microcontroller, (b) determine the user feedback data in accordance with at least the user inputs, and (c) transmit the user feedback data via the bus.

22. The integrated virtual button system of claim 21, wherein the bus is an $I^2C$ bus, a LIN bus, a CAN bus, an SPI bus, or a UART bus.

23. The integrated virtual button system of claim 21, wherein the state information comprises information of operational states of the host system.

24. The integrated virtual button system of claim 17, wherein the transient strain-sensing element is a piezoelectric micromechanical force-measuring element (PMFE).

25. The integrated virtual button system of claim 17, wherein:
the integrated virtual button system additionally comprises a second transducer configured to generate second signals in response to the perturbation; and
the microcontroller is configured to obtain second data from the second signals and determine the user inputs in accordance with at least the first data and the second data.

26. The integrated virtual button system of claim 25, wherein:
the cover member is electrically non-conducting;
the integrated virtual button system comprises an elastic circuit board substrate mechanically coupled to the cover member;
the second transducer comprises one or more sensor electrodes positioned on or in the elastic circuit board substrate; and
the second data comprise (1) capacitance between at least one of the sensor electrodes and its surrounding environment and/or (2) capacitance between a first one of the sensor electrodes and a second one of the sensor electrodes.

27. The integrated virtual button system of claim 25, wherein the second transducer comprises one or more piezoelectric micromechanical ultrasonic transducers (PMUTs).

28. The integrated virtual button system of claim 17, wherein the first transducer is attached to an inner surface of the cover member via an adhesive.

29. The integrated virtual button system of claim 28, wherein the adhesive comprises double-sided tape, pressure sensitive adhesive, epoxy adhesive, or acrylic adhesive.

30. The integrated virtual button system of claim 17, additionally comprising:
a second driver circuit configured to generate a second user feedback signal in accordance with the user feedback data; and
a second actuator electronically coupled to the second driver circuit,
wherein:
the second actuator emits a second haptic signal, a second audio signal, or a second visible light signal when driven by the second user feedback signal.

31. A method of determining user input and providing user feedback, comprising:
generating, by a first transducer, first signals in response to a perturbation at a cover member, the first transducer being mechanically coupled to the cover member;
obtaining, by a microcontroller, first data from the first signals;
determining, by the microcontroller, user inputs in accordance with at least the first data;
determining user feedback data in accordance with at least the user inputs and state information;
generating, by a first driver circuit, a first user feedback signal in accordance with the user feedback data; and
emitting, by a first actuator, a first haptic signal, a first audio signal, or a first visible light signal when driven by the first user feedback signal,
wherein the first actuator comprises one of a haptic actuator, a speaker, a light source, and a display;
wherein the first transducer comprises a transient strain-sensing element.

32. The method of claim 31, wherein determining user feedback data is carried out by the microcontroller.

33. The method of claim 31, wherein the state information comprises information of operational states of a system comprising the first transducer, the microcontroller, and the first driver circuit.

34. The method of claim 31, wherein determining user feedback data comprises executing, by a host processor of a host system, an integrated virtual button software code to (a) receive the user inputs from the microcontroller, (b) determine the user feedback data in accordance with at least the user inputs, and (c) transmit the user feedback data to the microcontroller and/or the first driver circuit.

35. The method of claim 34, wherein the state information comprises information of operational states of the host system.

36. The method of claim 31, additionally comprising:
generating, by a second driver circuit, a second user feedback signal in accordance with the user feedback data; and
emitting, by a second actuator, a second haptic signal, a second audio signal, or a second visible light signal when driven by the second user feedback signal.

* * * * *